US012776135B2

(12) United States Patent
Dapogny et al.

(10) Patent No.: US 12,776,135 B2
(45) Date of Patent: Oct. 27, 2026

(54) IN-SITU MODEL ADAPTATION FOR PRIVACY-COMPLIANT IMAGE PROCESSING

(71) Applicant: Datakalab, Paris (FR)

(72) Inventors: Arnaud Dapogny, Paris (FR); Kevin Bailly, Ivry sur Seine (FR); Lucas Fischer, Neuilly sur Seine (FR); Lucas Lugao Guimaraes, Paris (FR)

(73) Assignee: Datakalab, Paris (FR)

( * ) Notice: Subject to any disclaimer, the term of this patent is extended or adjusted under 35 U.S.C. 154(b) by 280 days.

(21) Appl. No.: 18/281,359

(22) PCT Filed: Mar. 11, 2022

(86) PCT No.: PCT/EP2022/056382
§ 371 (c)(1),
(2) Date: Sep. 11, 2023

(87) PCT Pub. No.: WO2022/189649
PCT Pub. Date: Sep. 15, 2022

(65) Prior Publication Data
US 2024/0161483 A1 May 16, 2024

(30) Foreign Application Priority Data
Mar. 11, 2021 (EP) .................................... 21305301

(51) Int. Cl.
*G06V 10/82* (2022.01)
*G06N 3/045* (2023.01)
*G06N 3/09* (2023.01)

(52) U.S. Cl.
CPC .................................. *G06V 10/82* (2022.01)

(58) Field of Classification Search
CPC ......... G06V 10/82; G06N 3/045; G06N 3/084
See application file for complete search history.

(56) References Cited

U.S. PATENT DOCUMENTS 12,086,858 B2 * 9/2024 Stenzel ................ A01B 79/005
2020/0234192 A1 7/2020 Vinyals et al.
(Continued)

OTHER PUBLICATIONS

International Search Report and Written Opinion, PCT/EP2022/056382, mailed Jul. 12, 2022.
(Continued)

*Primary Examiner* — Shefali D Goradia
(74) *Attorney, Agent, or Firm* — BAKERHOSTETLER

(57) ABSTRACT

The present disclosure is directed to methods of machine-learning for on-the-fly adaptation of a predictive model configured for image processing. The method includes providing a first predictive model to provide first prediction task, providing a second predictive model to provide a second prediction task, the second predictive model including one or more parameters, the second prediction task being derivable from the first prediction task, providing context-based images from a first stream of images obtained from an optical sensor to both the first and the second predictive models, each image provided on-the-fly, and performing an on-the-fly adaptation for the second predictive model, the on-the-fly adaptation comprising, for each provided image: performing a respective first prediction by the first predictive model and a respective second prediction by the second predictive model, computing a cost function, and updating the one or more parameters of the second predictive model based on the cost function.

22 Claims, 13 Drawing Sheets

(56) References Cited

U.S. PATENT DOCUMENTS

| | | | | |
|---|---|---|---|---|
| 2021/0295204 | A1* | 9/2021 | Bhide | G06N 5/04 |
| 2021/0342745 | A1* | 11/2021 | Zeiler | G06F 8/65 |
| 2022/0400251 | A1* | 12/2022 | Fisher | G16H 50/20 |

OTHER PUBLICATIONS

Abhijit Suprem et al: "ODIN: Automated Drift Detection and Recovery in Video Analytics", arxiv.org, Cornell University Library, 201 Olin Library Cornell University Ithaca, NY 14853, Sep. 9, 2020 (Sep. 9, 2020), XP081760559.

Romil Bhardwaj et al: "Ekya: Continuous Learning of Video Analytics Models on Edge Compute Servers", arxiv.org, Cornell University Library, 201 Olin Library Cornell University Ithaca, NY 14853, Dec. 19, 2020 (Dec. 19, 2020), XP081842632.

Mullapudi Ravi Teja et al: "Online Model Distillation for Efficient Video Inference", 2019 IEEE/CVF International Conference on Computer Vision (ICCV), IEEE, Oct. 27, 2019 (Oct. 27, 2019), pp. 3572-3581, XP033723729, DOI: 10.1109/ICCV.2019.00367.

Tian Kai et al: "Versatile Multiple Choice Learning and Its Application to Vision Computing", 2019 IEEE/CVF Conference on Computer Vision and Pattern Recognition (CVPR), IEEE, Jun. 15, 2019 (Jun. 15, 2019), pp. 6342-6350, XP033687071, DOI: 10.1109/CVPR.2019.00651.

Arnaud, E., Dapogny, A., Bailly, K.: Thin: Throwable information networks and application for facial expression recognition in the wild. arXiv preprint arXiv:2010.07614 (2020).

Breiman, L.: Random forests. Machine learning 45(1), 5-32 (2001).

Chen, L.C., Papandreou, G., Kokkinos, I., Murphy, K., Yuille, A.L.: Deeplab: Semantic image segmentation with deep convolutional nets, atrous convolution, and fully connected crfs. IEEE transactions on pattern analysis and machine intelligence 40(4), 834-848 (2017).

Deng, J., Dong, W., Socher, R., Li, L.J., Li, K., Fei-Fei, L.: ImageNet: A Large-Scale Hierarchical Image Database. In: CVPR09 (2009).

Girshick, R.: Fast r-cnn. In: Proceedings of the IEEE International Conference on Computer Vision (ICCV) (Dec. 2015).

He, K., Gkioxari, G., Doll'ar, P., Girshick, R.: Mask r-cnn. In: Proceedings of the IEEE international conference on computer vision. pp. 2961-2969 (2017).

Hendrycks, D., Gimpel, K.: A baseline for detecting misclassified and out-of-distribution examples in neural networks. Proceedings of International Conference on Learning Representations (2017).

Hinton, G., Vinyals, O., Dean, J.: Distilling the knowledge in a neural network. In: NIPS Deep Learning and Representation Learning Workshop (2015).

Howard, A., Sandler, M., Chu, G., Chen, L.C., Chen, B., Tan, M., Wang, W., Zhu, Y., Pang, R., Vasudevan, V., Le, Q.V., Adam, H.: Searching for mobilenetv3. In: Proceedings of the IEEE/CVF International Conference on Computer Vision (ICCV) (Oct. 2019).

Johnson, J., Alahi, A., Fei-Fei, L.: Perceptual losses for real-time style transfer and superresolution. In: European conference on computer vision. pp. 694-711. Springer (2016).

Karras, T., Laine, S., Aila, T.: A style-based generator architecture for generative adversarial networks. In: Proceedings of the IEEE conference on computer vision and pattern recognition. pp. 4401-4410 (2019).

Kim, J., Kwon Lee, J., Mu Lee, K.: Accurate image super-resolution using very deep convolutional networks. In: Proceedings of the IEEE conference on computer vision and pattern recognition. pp. 1646-1654 (2016).

Lakshminarayanan, B., Pritzel, A., Blundell, C.: Simple and scalable predictive uncertainty estimation using deep ensembles. In: Advances in Neural Information Processing Systems. vol. 30, pp. 6402-6413 (2017).

Lin, T.Y., Goyal, P., Girshick, R., He, K., Doll'ar, P.: Focal loss for dense object detection. In: Proceedings of the IEEE international conference on computer vision. pp. 2980-2988 (2017).

Meyerson, E., Miikkulainen, R.: Beyond shared hierarchies: Deep multitask learning through soft layer ordering. In: International Conference on Learning Representations (2018).

Opitz, D., Maclin, R.: Popular ensemble methods: An empirical study. Journal of artificial intelligence research 11, 169-198 (1999).

Ranjan, R., Patel, V.M., Chellappa, R.: Hyperface: A deep multi-task learning framework for face detection, landmark localization, pose estimation, and gender recognition. IEEE Transactions on Pattern Analysis and Machine Intelligence 41(1), 121-135 (2017).

Ronneberger, O., Fischer, P., Brox, T.: U-net: Convolutional networks for biomedical image segmentation. In: International Conference on Medical image computing and computerassisted intervention. pp. 234-241. Springer (2015).

Schroff, F., Kalenichenko, D., Philbin, J.: Facenet: A unified embedding for face recognition and clustering. In: Proceedings of the IEEE conference on computer vision and pattern recognition. pp. 815-823 (2015).

Tan, M., Le, Q.: EfficientNet: Rethinking model scaling for convolutional neural networks. In: Chaudhuri, K., Salakhutdinov, R. (eds.) Proceedings of the 36th International Conference on Machine Learning. vol. 97, pp. 6105-6114 (2019).

Wang, M., Deng, W.: Deep visual domain adaptation: A survey. Neurocomputing 312, 135-153 (2018).

Wang, T.C., Liu, M.Y., Zhu, J.Y., Tao, A., Kautz, J., Catanzaro, B.: High-resolution image synthesis and semantic manipulation with conditional gans. In: Proceedings of the IEEE Conference on Computer Vision and Pattern Recognition (2018).

Yuksel, S.E., Wilson, J.N., Gader, P.D.: Twenty years of mixture of experts. IEEE transactions on neural networks and learning systems 23(8), 1177-1193 (2012).

Zhou, X., Wang, D., Krähenbühl, P.: Objects as points. arXiv preprint arXiv:1904.07850 (2019).

* cited by examiner baseline

| mAP train \ test | 308 | 355 | 405 | 720 | 730 | 743 |
|---|---|---|---|---|---|---|
| 308 | 0,47195 | 0,4212 | 0,17245 | 0,1647 | 0,404 | 0,3569 |
| 355 | 0,47195 | 0,4212 | 0,17245 | 0,1647 | 0,404 | 0,3569 |
| 405 | 0,47195 | 0,4212 | 0,17245 | 0,1647 | 0,404 | 0,3569 |
| 720 | 0,47195 | 0,4212 | 0,17245 | 0,1647 | 0,404 | 0,3569 |
| 730 | 0,47195 | 0,4212 | 0,17245 | 0,1647 | 0,404 | 0,3569 |
| 743 | 0,47195 | 0,4212 | 0,17245 | 0,1647 | 0,404 | 0,3569 |

w/ KD

| mAP train \ test | 308 | 355 | 405 | 720 | 730 | 743 |
|---|---|---|---|---|---|---|
| 308 | **0,731** | 0,102 | 0,058 | 0,15 | 0,207 | 0,074 |
| 355 | 0,557 | **0,745** | 0,199 | 0,058 | 0,339 | 0,307 |
| 405 | 0,541 | 0,098 | **0,499** | 0,086 | 0,422 | 0,49 |
| 720 | 0,14 | 0,008 | 0,028 | **0,623** | 0,289 | 0,022 |
| 730 | 0,233 | 0,073 | 0,09 | 0,078 | **0,615** | 0,136 |
| 743 | 0,467 | 0,307 | 0,2 | 0,081 | 0,32 | **0,597** |

FIG. 12

| ID video | Baseline | Mean confidence | Max confidence(WTA) | Rel.improvement | Best specialist |
|---|---|---|---|---|---|
| 308 | 0,468 | 0,485 | **0,672** | 0,203 | 0.731 |
| 355 | 0,418 | 0.145 | **0,691** | 0,272 | 0.745 |
| 405 | 0,173 | 0.214 | **0,384** | 0,211 | 0.499 |
| 720 | 0,173 | 0,069 | **0,562** | 0,389 | 0,623 |
| 730 | 0,409 | 0,397 | **0,562** | 0,152 | 0,615 |
| 743 | 0,351 | 0,285 | **0,594** | 0,242 | 0,597 |
| Avg. | 0,332 | 0,266 | **0,578** | **0,245** | 0,635 |

FIG. 13

| ID video | Baseline | Mean confidence | Max confidence(WTA) | Rel.improvement |
|---|---|---|---|---|
| 308 | 0,468 | 0,271 | **0,596** | 0,128 |
| 355 | 0,418 | 0,044 | **0,479** | 0,061 |
| 405 | 0,173 | 0,114 | **0,254** | 0,081 |
| 720 | 0,173 | 0,035 | **0,198** | 0,024 |
| 730 | 0,409 | 0,291 | **0,491** | 0,081 |
| 743 | 0,351 | 0,153 | **0,512** | 0,160 |
| Avg. | 0,332 | 0,151 | **0,422** | **0,089** |

FIG. 14

IN-SITU MODEL ADAPTATION FOR PRIVACY-COMPLIANT IMAGE PROCESSING

RELATED APPLICATIONS

This application is a 35 U.S.C. § 371 US national stage entry and is entitled to the earliest effective filing date of international application number PCT/EP2022/056382, filed on Mar. 11, 2022, which itself claims priority to EP Application Serial No. 21305301.0, filed on Mar. 11, 2021. The contents of the aforementioned applications are incorporated herein by reference.

FIELD

Embodiments of the invention relate in general to the field of computer programs and systems, and specifically to a method, system, processing machine, and program for machine-learning for an on-the-fly adaptation of a predictive model configured for image processing.

BACKGROUND

A number of methods, systems and programs are offered on the market for automated computer vision-based techniques via deep learning techniques. These techniques are extensively used for different tasks, including (but not limited to) segmentation, object detection, object tracking or re-identification, object classification, regression, and/or image generation.

Deep learning approaches are notoriously known for being "data-hungry", i.e., requiring a lot of data to function efficiently. Further, it is well-known how to train deep learning models on specific data distributions; nevertheless, there is generally a gap between the training/testing distribution of the data which is used to train and evaluate the model and the real, in-situ deployment conditions. Such a difference may cause a significant performance loss when confronting the models to real-world scenarios.

Furthermore, manual annotation (i.e., labelling) of the real-world data is often not an option for privacy concerns, or due to the technical expense of doing so. The requirement to comply with privacy regulations General Data Protection Regulation (GDPR) may cause the applications of some solutions on the market to be abandoned.

Document "Online model distillation for efficient video inference.", Mullapudi, Ravi Teja, et al., Proceedings of the IEEE International Conference on Computer Vision. 2019 relates to a technique—hereinafter be referred to as JIT-Net (standing for Just-in-time network)—of supervising a low-cost student model using the output of a high-cost teacher, to specialize accurate, low-cost semantic segmentation models to a target video stream. Rather than learn a specialized student model on offline and manually annotated data from the video stream, the student model is trained in an online fashion on the live video, intermittently running the teacher to provide a target for learning.

Low-cost networks are trained by retraining a small neural net, called the student network, upon mimicking the prediction of a larger, more efficient network, the teacher network, using knowledge distillation. Knowledge distillation is discussed in Hinton, G., Vinyals, O., Dean, J.: Distilling the knowledge in a neural network. In: NEURIPS Deep Learning and Representation Learning Workshop (2015).

However, JIT-Net is specific to instance segmentation, using a Mask-RCNN teacher and a specific, hand-crafted original architecture for the student; and therefore, not applicable for more generic use of the hyper-specification process via in-situ adaptation. In addition, JIT-Net does not work for in-situ on-the-fly calibration to specific contexts such as object detection, object tracking or re-identification, object classification (which will be claimed use cases), regression, or image generation, and so on.

Another fundamental drawback of JIT-Net is that each provided image to the method is used several times for training the model, e.g., the student. Hence, from an industrial deployment point of view, a fully on-the-fly in-situ model adaptation, and an efficient software architecture for on-device hyper-specification for devices having limited resources (e.g., memory, computational) may be problematic for the above-mentioned reasons.

Within this context, there is still a need for an improved machine-learning method for on-the-fly adaptation of a predictive model configured for image processing.

BRIEF SUMMARY OF THE INVENTION

It is therefore provided a computer-implemented method of machine-learning for on-the-fly adaptation of a predictive model configured for image processing. The method of machine-learning comprises providing a first predictive model having been configured to provide at least one first prediction task. The method further comprises providing a second predictive model having been configured to provide a second prediction task, the second predictive model comprising one or more parameters, and the second prediction task being derivable from the first prediction task. The method further comprises providing context-based images from a first stream of images obtained from an optical sensor to both the first and the second predictive models, each provided image being provided just once on-the-fly and performing an on-the-fly adaptation for the second predictive model. The on-the-fly adaptation comprises, for each provided image, performing a respective first prediction by the first predictive model and a respective second prediction by the second predictive model, computing a cost function of the respective first prediction and the respective second prediction, and updating the one or more parameters of the second predictive model based on the computed cost function.

The method of machine-learning may comprise one or more of the following:

- performing the on-the-fly adaptation for the second predictive model further comprises calibrating the second predictive model by performing the on-the-fly adaptation for the second predictive model using a few-shot learning method that is carried out with a limited number of the context-based images obtained, on-the-fly and just once, from the first stream of images;
- prior to, performing, for each provided image, the respective first prediction and the respective second prediction, computing a prior condition from prior information of the provided image, and determining, based on the prior condition, whether the one or more images are to be provided to the first and the second model; and
- adjusting the computed cost function based on the prior information and updating the one or more parameters of the second predictive model based on the adjusted cost function.

It is further provided a computer-implemented method of inference by one or more predictive models each trained according to the method of machine-learning. The method of inference comprises providing one or more predictive models each trained according to the method of machine-learning. The method further comprises providing a context-based image from a second stream of images, obtaining one or more predictions each obtained by applying one of the one or more predictive models to the provided image, computing one or more weights, each weight being computed for one of the one or more predictions, and computing a prediction from a combination of the one or more predictions and their respective one or more weights.

The method of inference may comprise one or more of the following:

- providing a baseline predictive model, obtaining, for the context-based image provided from the second stream, a prediction by applying the baseline predictive model to the provided image, and computing a weight corresponding to the prediction obtained by the baseline predictive model, wherein the performing an inference is based on the prediction obtained by the baseline predictive model and the corresponding weight, and based on the one or more predictions and the corresponding one or more weights;
- the computing one or more weights, each weight corresponding to one of the one or more predictions and the computing a weight corresponding to the prediction obtained by the baseline predictive model further comprise computing a prior condition from the prior information of the provided image;
- providing a reference predictive model; and wherein the computing the one or more weights, each weight corresponding to one of the one or more predictions, and/or the computing the weight corresponding to the prediction obtained by the baseline predictive model comprise computing a posterior condition based on one or more of the following: the prediction of the predictive model corresponding to the weight, and/or a prediction obtained by the reference predictive model for the provided image; and
- the provided baseline predictive model has been trained according to the method of machine-learning.

It is further provided a computer program comprising instructions which, when executed on a computer system, causes the computer system to perform the method of machine learning, and/or the method of inference.

It is further provided a processing machine. The processing machine comprises a first interface configured to receive a stream of images from an optical sensor, a data storage unit configured to store one or more predictive models each trained according to the method of machine-learning, and a processing unit configured to perform one or more methods of machine-learning each according to the disclosed method of machine-learning, and perform a method of inference according to the method of inference by providing one or more of the one or more predictive models stored on the data storage unit.

The processing unit of the processing machine may be further configured to re-train one or more of the one or more predictive models stored on the data storage unit, and select one or more of the one or more predictive models stored on the data storage unit and to perform the method of inference on the selected one or more predictive models. Alternatively or additionally the processing machine may further comprise a second interface configured to connect with a repository, wherein the processing unit is further configured to store on the repository the one or more predictive models if a condition is satisfied, and retrieve one or more predictive models stored on the repository.

It is further provided a system comprising one or more processing machines according to the processing machine, and one or more optical sensors, each optical sensor being connected to one or more of the one or more processing machines for sending context-based images from a third stream of images.

BRIEF DESCRIPTION OF THE DRAWINGS

FIGS. 12-13 illustrate assessment of intra-video specificity;

FIGS. 13-15 show example experimental results for the precision of an ensemble of models.

Similar or functionally similar elements in the figures have been allocated the same reference signs if not otherwise indicated.

DETAILED DESCRIPTION OF EMBODIMENTS OF THE INVENTION

Figure 1:
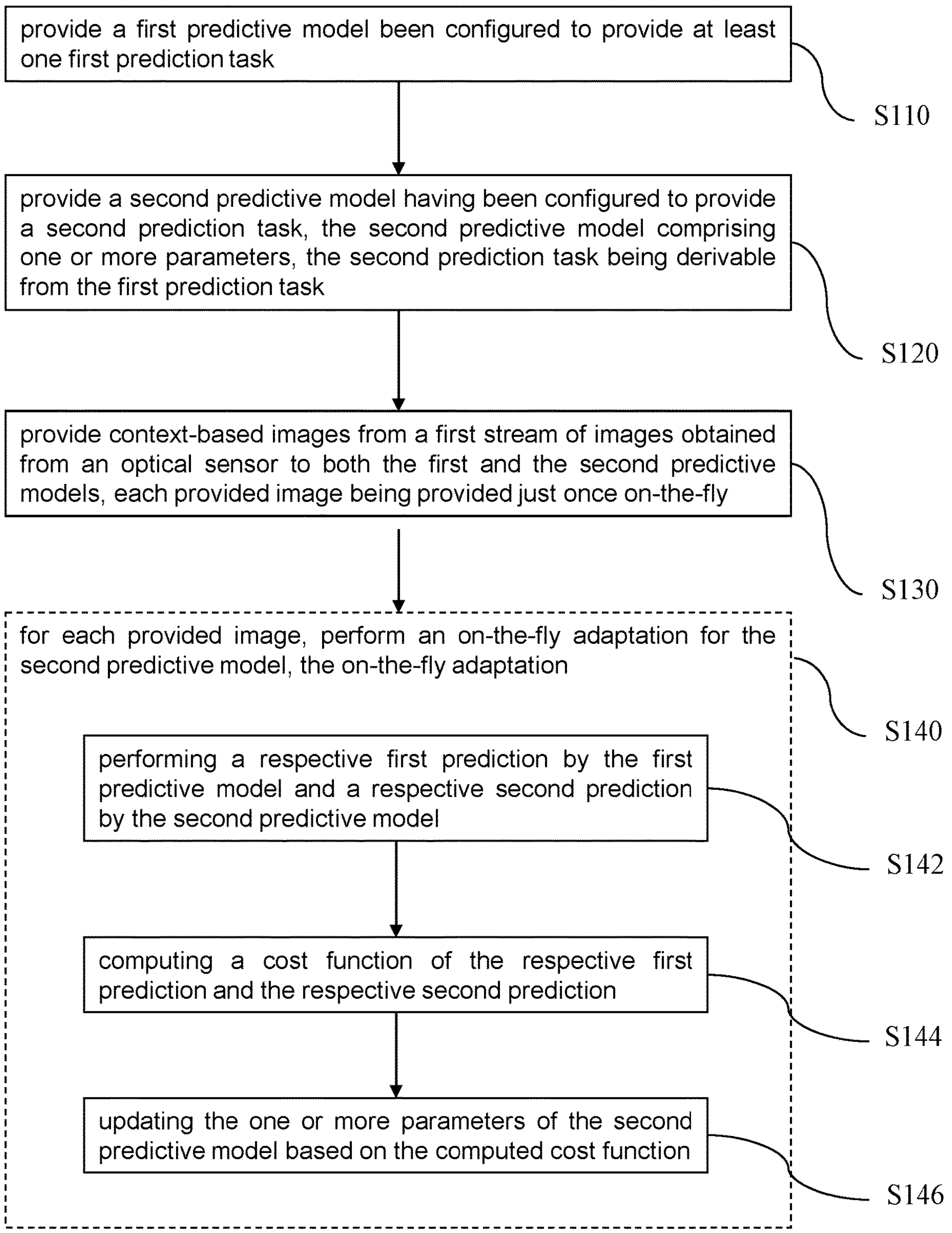
FIG. 1 shows a possible sequence of method steps of machine-learning for on-the-fly adaptation of a predictive model configured for image processing.

With reference to the flowchart of FIG. 1, it is proposed a computer-implemented method of machine-learning for on-the-fly adaptation of a predictive model configured for image processing. The method comprises providing (S110) a first predictive model that has been configured to provide at least one first prediction task. The method further comprises providing (S120) a second predictive model. The second predictive model has been configured to provide a second prediction task. The second predictive model comprises one or more parameters and is derivable from the first prediction task. The method further comprises providing (S130) context-based images from a first stream of images obtained from an optical sensor to both the first and the second predictive models. Each provided image is provided just once on-the-fly. The method further comprises performing (S140) an on-the-fly adaptation of the second predictive model. The on-the-fly adaptation comprises, for each provided image, performing (S142) a respective first prediction by the first predictive model and a respective second prediction by the second predictive model, computing (S144) a cost function of the respective first prediction and the respective second prediction; and updating (S146) the one or more parameters of the second predictive model based on the computed cost function.

This constitutes an improved method for an on-the-fly adaptation of a predictive model configured for image processing by allowing an adaptation of a second predictive model based on the first model while the training data is only provided once on-the-fly. Thus, the machine-learning method does not require collecting the training data in a data storage. This in particular improves the in-situ capability of the method to perform an adaptation of the model on-the-fly. Such an improvement, for example, is beneficial in application of devices with small memory or computational resources and/or devices which are required to have fast response time, for example, live cameras, and portable devices. This further improves the real-time performance as there is no dependence of the steps on the past images, thereby enables the method to deal with the inputted images from an input sensor like a camera in real-time and without lagging caused by loading and/or treating old images that may be saved on a local memory. Further, providing images only once on-the-fly reduces the traffic on the network and/or hardware connection(s) to load/save the images from/in a memory for a later use. In addition, the on-the-fly distillation capability without ever sending the data itself to a distant server, nor ever storing it locally on a hard-disk allows a fully privacy-compliant procedure.

Figure 2:
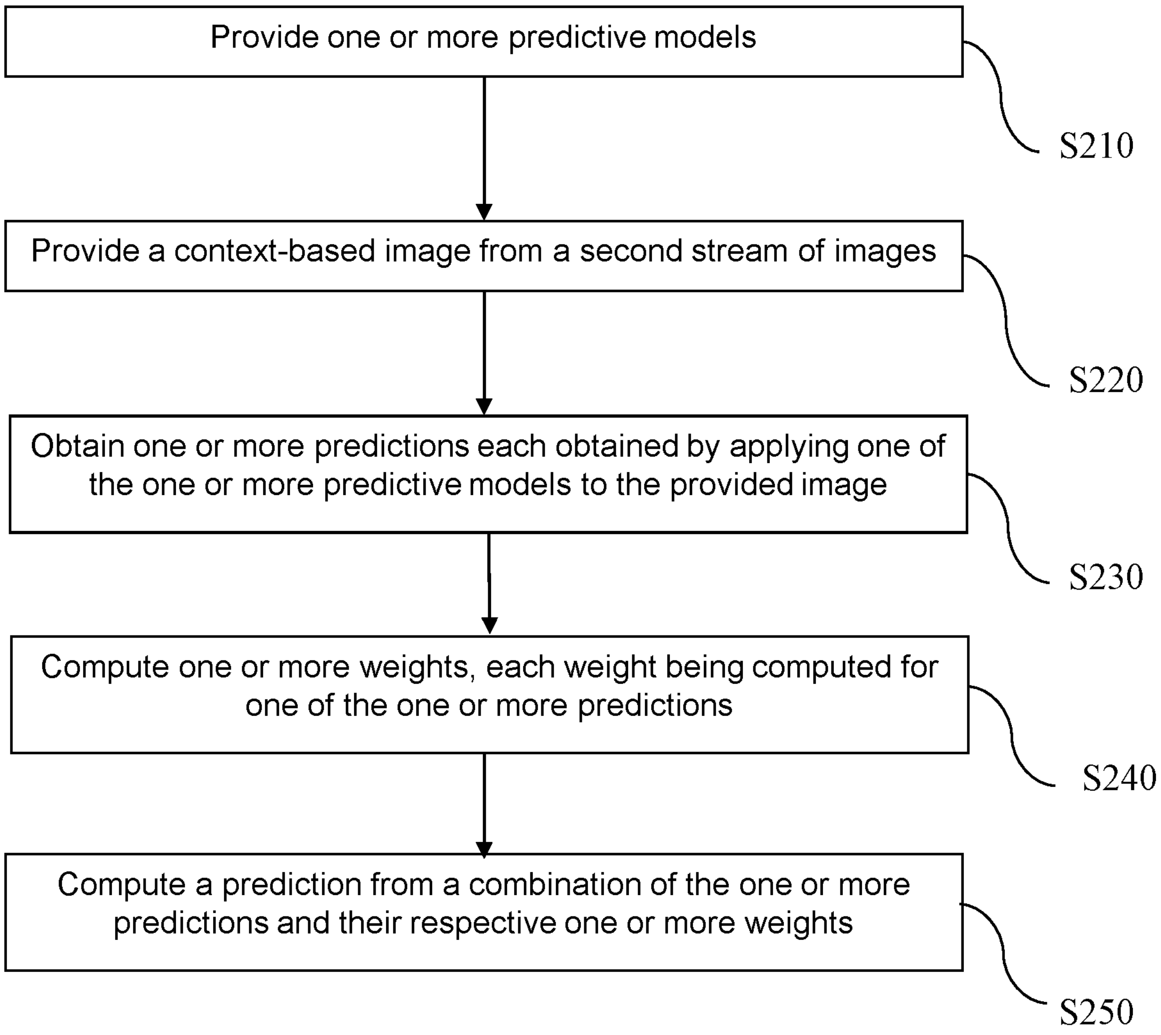
FIG. 2 shows a possible sequence of method steps of using the trained model for performing an inference.

With reference to the flowchart of FIG. 2, it is further proposed a computer-implemented method of inference by one or more predictive models each trained according to the method of machine-learning.

The method of inference comprises providing (S210) one or more predictive models each trained according to the method of machine-learning. The method of inference further comprises providing (S220) a context-based image from a second stream of images, obtaining (S230) one or more predictions each obtained by applying one of the one or more predictive models to the provided image, computing (240) one or more weights, each weight being computed for one of the one or more predictions, and computing (250) a prediction from a combination of the one or more predictions and their respective one or more weights.

The method of inference is thus a method of use of one or more predictive models trained according to the machine-learning for performing an inference. This constitutes an improved method for inference by using an ensemble of the predictive models to perform a prediction.

It is further proposed a computer program comprising instructions which, when executed on a computer system, cause the computer system to perform the method of machine learning, and/or the method of inference.

It is further proposed a processing machine. The processing machine comprises a first interface configured to receive a stream of images from an optical sensor. The processing machine further comprises a data storage unit configured to store one or more predictive models each trained according to the method of machine-learning, and a processing unit configured to perform one or more methods of machine-learning each according to the disclosed method of machine-learning, and perform a method of inference by providing one or more of the one or more predictive models stored on the data storage unit.

It is further proposed a system comprising one or more processing machines; and one or more optical sensors. Each optical sensor is connected to one or more of the one or more processing machines for sending context-based images from a third stream of images.

The method of machine-learning and the method of inference relate to a predictive model configured for image processing. Such a model may be attributed to performing specific one or more prediction tasks, or equivalently prediction. By "performing one or more prediction tasks" it is meant that the predictive model may take as input one or more images or at least part (i.e., a fraction) of one or more images and output, i.e., predict, one or more values. Each prediction task may correspond to a subset of the outputted values of the predictive model. In examples, the prediction task may be a function of the subset of the outputted values of the predictive model. Each prediction task (e.g., detection of all numbers in an input image) may comprise of one or more of prediction subtasks (e.g., detection of even and/or odd numbers in the input image). Each subtask may relate to a subset of the subset of the outputted values corresponding to a prediction task.

The one or more images may be inputted in a format treatable by the predictive model by any of the known formats and methods known in the field of image analysis. The one or more images may be one or more parts of the said one or more images. The one or more prediction tasks may relate to different applications of machine-learning in image analyses such as object detection, semantic segmentation, classification, regression, object tracking/re-identification and/or image enhancement and domain adaptation and the like.

One or more of the above-mentioned applications may be employed to contribute to solutions in various and unlimited industrial fields. Such applications may relate to smart cities for example, amongst others, in license plate recognition, vehicle features recognition, traffic event detection, bad car behaviour detection, trash detection, public transport sage, intersection/monitoring system, illegal parking system, traffic flow optimization, anonymisation system by blurring. Such applications may relate to airport analysis. Such applications may relate to intrusion detection and video surveillance for example, amongst others, density estimation, perimeter protection and alarm system, queue detection, behaviour analysis. Such applications may relate to border control, for example, amongst other, identity and verification system, license plate control, anti-spoofing, fraud detection. Further, such applications may relate to automated convenience store. Further, such applications may relate to retail, for example, amongst others, on shelf product availability, shoplifting estimation, outfit trying and outfit trying simulation, mall analysis and people counting, digital out of home analysis. Such applications may relate to improving video quality, for example, amongst other, dehazing, restoration of photos, dark light enhancement. Such applications may further relate to medical applications, for example, amongst others, mask detection, heart rate estimation, temperature estimation, ultrasound software optimization. Such applications may further, relate to logistics, for example, amongst other, warehouse management, driving regulations, entrance/exit control, detection of production anomaly, and/or hard hat and safety jacket selection. Such applications may further relate to weather estimation and/or geospatial intelligence. Such applications may further relate to mobile systems, for example, amongst other, scanner application, face filter optimization.

The method of machine-learning according to the present disclosure comprises providing (S110) a first predictive model. The first predictive model may be trained, i.e., learnt, on at least one dataset according to any known machine-learning or may be a data-free method such as rule-based models. For that, each data piece of the dataset comprising an image in relation to one or more respective ground truth values or labels forms a respective potential training sample. In examples, the first predictive model may comprise an ensemble of models each trained on one or more datasets. The training samples represent the diversity of the situations where the predictive model is to be used after being learnt. Any dataset referred herein (e.g., before or after restriction) may comprise a number of (e.g., potential) training samples higher than 1000, 10000, or 100000. In examples, the dataset may comprise a respective metadata for each of the images of the dataset definition. The first predictive model is configured to provide at least one first prediction task.

The method further comprises providing (S120) a second predictive model having been configured to provide a second prediction task. The second predictive model comprises one or more parameters. The one or more parameters define the relationship between the input and the output of the model. The value for the one or more model parameters may be obtained during an adaptation. The term "adaptation" may encompass—and hereinafter be equivalently referred to as—training and/or pre-training. The pre-training may be a training before performing a main training (i.e., adaptation) of the predictive model.

The second prediction task is derivable from the first prediction task. By being "derivable" it is meant that the second prediction task may be related to the first prediction task. In examples, the second prediction task is a subset of the first prediction subtasks, thereby the relation between the first prediction task and the second prediction task is that the latter is a subset of the former. In particular examples, the second prediction task may be one of the prediction subtasks of the first prediction task.

The second predictive model may be (pre-)trained on at least one dataset to any known machine-learning method. Each data piece of the dataset comprising an image in relation to one or more respective ground truth values or labels forms a respective potential training sample. The dataset on which the second predictive model is (pre-) trained may be the same as or a restriction of the dataset on which the first predictive model is trained.

In examples, the first predictive model may comprise one or more models each being any of predictive models known from the field of machine-learning. In particularly efficient examples, any of the first predictive model(s) and the second predictive model may be a neural network, a deep neural network, or in particular a convolutional neural network (CNN) or any combination thereof.

In examples, the first predictive model is a generic model. The term "generic" denotes that the first predictive model is trained based on at least a generic dataset, i.e., a dataset with a significant diversity in the training dataset compared to the situations where the second predictive model is to be used (i.e., performs prediction) after being adapted (or equivalently trained).

The method further comprises providing context-based images from a first stream of images obtained from an optical sensor to both the first and the second predictive models, wherein each provided image is provided just once on-the-fly. An optical sensor may be a video capturing device or any generic device capable and configured to provide a stream, i.e., sequence of images. The stream of images may be ordered sequentially. The provided images are context-based. By being "context-based" it is meant the data of each image defines a context of the image. The context of an image is defined by a subset of fixed (or with a very small variation) of the contextual parameters, including but not limited to: (i) a number of camera settings like geographic position (latitude and longitude) of the camera, angle of the camera to the ground, camera shot, optical parameters of the camera, camera sensor, resolution of the camera, number of camera channels, and hardware present in the camera, (ii) external parameters of the camera like luminosity, weather conditions, depth of field, presence of an object in the field of the camera (e.g., tree, wall, poster, bench), precise time of day, season, and interior/exterior. It is to be understood that the context of an image comprises at least one of the contextual parameters of (i) and/or (ii), and that any combination of the contextual parameters may define a context of an image. In examples, for a fixed camera analyzing an exterior scene whose brightness changes during the day, the angle and the shot of the camera may define the context but probably not the time of the day. In particularly efficient examples, all the provided images may have a similar context. Each image is provided once on-the-fly; in other words, images of the first stream of images is provided sequentially and each image is not accessible by the first and/or the second predictive models when a subsequent image is provided to the first and/or the second predictive models, respectively.

Further, the method comprises performing (S140) an on-the-fly adaptation for the second predictive model. By on-the-fly adaptation, it is meant that older training data is no longer accessible to the method (e.g., the first and the second predictive models) when new training data is provided to the method (e.g., the provided image is discarded after each update of the second predictive model in the adaptation). In examples where the second predictive model is pre-trained on at least one dataset, performing the on-the-fly adaptation re-trains, i.e., updates (the values of) the one or more parameters of the pre-trained second predictive model, after each image of the first stream of images being provided.

The number of provided images from the first stream of images may be static, i.e., independently of the in-situ adaptation, or may be set dynamically depending on the updating of the second predictive model during the on-the-fly adaptation. Alternatively or additionally, the number of provided images from the first stream of images. In examples, the on-the-fly adaptation may be stopped if a stopping condition is satisfied. In examples, the stopping condition may be satisfied if the number of the updates of the second predictive model passes a threshold (e.g., 1000, or 10000), if the difference between the two consecutive updates is closer than a threshold in some distance metric, and/or if the one or more consecutive provided images are closer to each other in some distance metric.

The online training comprises performing (S142), for each provided image, a respective first prediction by the first predictive model and a respective second prediction by the second predictive model. The on-the-fly adaptation further computes (S144) a cost function of the respective first prediction and the respective second prediction. In examples, computing the cost function may comprise computing a metric for the error, i.e., distance between the first prediction and the second prediction. The metric may be a norm, for example any vector norm between the respective outputted values of the first and the second predictions by the first and the second predictive models, respectively. The choice of the cost function and the norm may be in accordance with any known method in the field of machine-leaning. Hereinafter, the cost function may be equivalently referred to as loss function.

The on-the-fly adaptation further comprises updating (S146) the one or more parameters of the second predictive model based on the computed cost function. Such an update may seek to modify the values of the one or more parameters of the second predictive model such that the cost function decreases (when—hypothetically—computed based on the first prediction and the updated second prediction). Such an update may be computed by any known method of the fields of optimization and/or machine learning, for example by using one or more of the backpropagations such as stochastic gradient descent (SGD).

As the training of the second model is performed based on a first model, the first model may be hereinafter equivalently referred to as a teacher predictive model, a teacher model, or simply a teacher. Similarly, the second model may be hereinafter equivalently referred to as a student predictive model, a student model, or simply a student.

The technical effect of the machine-learning method discussed above goes beyond the traditional knowledge distillation methods for performing an on-the-fly training as the images of the first stream of images are not stored on a memory. Such an on-the-fly distillation is capable to be performed in real-time and on local devices, without ever sending the data itself to a distant server, nor ever storing it locally on a hard-disk, thus allowing its application on small devices and in a fully privacy-compliant procedure. Furthermore, as the images of the stream of images are context-based such an on-the-fly training (distillation) is capable to use for specialization (also referred to as hyper-specialization, or hyper-specification) of a second model for a specific context. The specification/specialization denotes training a student model for a specific prediction task and for a specific context of the provided context-based images according to a teacher model. Such a specialization may be employed to train low-cost but time-efficient "specialist" student models for that specific prediction task and specific context, for example specialist object/face detectors for the indoor scenes (like train stations).

Figure 3:
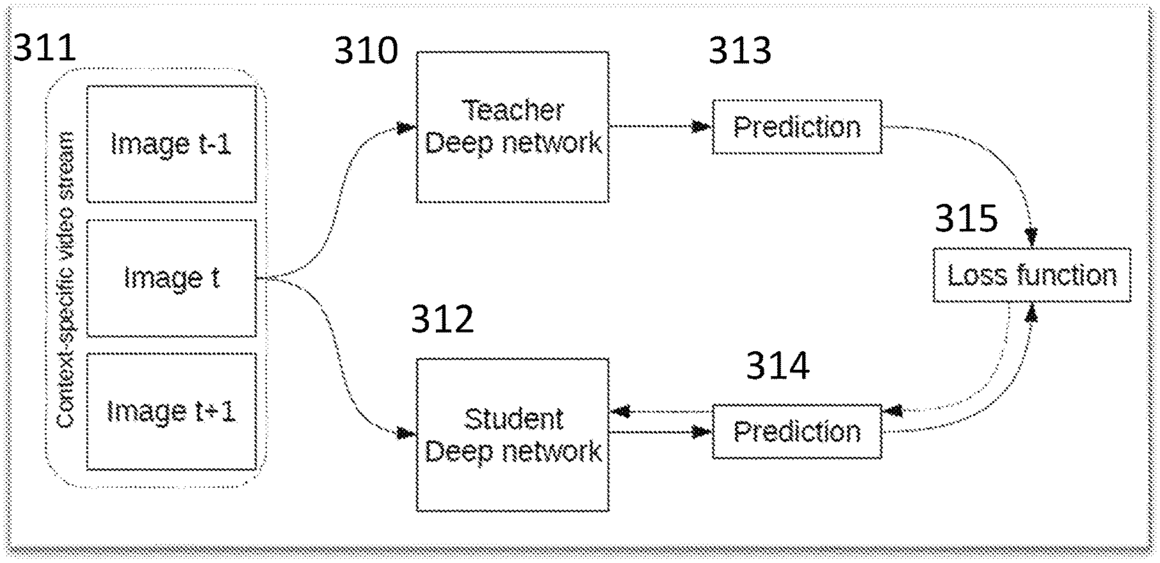
FIG. 3 shows an example of a model of hyper-specification process.

Examples of the method of machine-learning are now discussed in reference to FIG. 3.

A first predictive model 310 $T_\psi$ is provided. The model $T_\psi$ may be a teacher model with one or more parameters denoted by $\psi$. A teacher model is typically defined as a highly accurate model with a considerable runtime. A second predictive model 312 $S_\phi$ is also provided. The model $S_\phi$ may be a student model with one or more parameters denoted by $\phi$. A student model is typically defined as a low accurate model compared with a low runtime, i.e., fast. In particular, the student model may have lower accuracy compared to the teacher model for a second prediction task (which is derivable from the first prediction task).

A stream of images 311 is provided comprising context-based images (or as equivalently may be called context-specific images)

$$I_v^t, \text{ for } t-1, \ldots, t, \ldots, t+1.$$

The stream may come from a live video camera, for example a CCTV in a retail store or a train station. The notation v signifies the particular context shared by the sequence of images of the stream. Each of the images of the stream (or a subset thereof) is forwarded the model $T_\psi$ and the model $S_\phi$ to obtain the first prediction 313 by the teacher model and the second prediction 314 by the student model, respectively. Each image is provided on-the-fly and used one single time for training the student and teacher models; no image is kept for a future reuse, e.g. on a database. Next, a cost (or loss) function 315 L may be computed based on the prediction of the student model and the prediction of the teacher model. Then, the parameters $\phi$ of the student model $S_\phi$ may be updated based on the computed cost function L and by backpropagation (dashed arrows on FIG. 3). In other words, the teacher model $T_\psi$ provides a "pseudo ground-truth" to train the student model $S_\phi$. Further, in examples where all images of the stream belong to a same context v the on-the-fly training process of FIG. 3 is a "hyper-specification training" process, i.e., a training process to train the student model $S_\phi$ to be a specialist for performing a prediction task on the images of a particular context.

In some examples, the first predictive model and the second predictive model are independent, i.e., being trained on independent dataset. Alternatively, the first and the second predictive models may be not independent and the second model may be trained on all or part of the dataset on which the first predictive model is trained. In particularly efficient examples, the first and the second models are neural networks with a similar architecture, for example, the teacher and student model may differ only by the size of the backbone used to extract representations (e.g. ENB0-7 or MBV3 networks).

Back to FIG. 3, the teacher model $T_\psi$ may be any generic predictive model, for example any deep or shallow network. The teacher model may be $T_\psi$ differentiable or not differentiable. Additionally or alternatively, the teacher model $T_\psi$ may comprise an ensemble of models trained on different databases.

Performing the on-the-fly adaptation for the second predictive model according to the method of machine-learning may further comprise calibrating the second predictive model by performing the online training for the second predictive model using a few-shot learning method. As known per se, few-shot learning (FSL) is a type of machine learning where the training dataset contains limited information. In other words, the few-shot learning may be considered as a short-term part of the adaptation. The on-the-fly adaptation according to FSL then may be carried out with a limited number of the context-based images obtained, on-the-fly and just once, from the first stream of images. Thus calibration may only include the first initial phase of the training (i.e., distillation) of the second predictive model. In examples, after the second predictive model being calibrated using the limited number of context-based images from the first stream, the updating of the second predictive model may be stopped. The calibration may be restarted upon satisfaction of a condition, for example if the context of a succeeding provided image is different from the context on which the second model is calibrated. The limited number of images may be the images from frames of at least one hour (e.g., two hours) of the first stream.

The method of machine-learning may further comprise prior to performing, for each provided image, the respective first prediction and the respective second prediction, computing a prior condition from prior information of the provided image. The prior information may correspond to a set of extractable information from an image, or a set of metadata associated with the image. The prior information of the image qualifies the context of the image (e.g., a video stream to which the image belongs) independently of the prediction by the model. In examples, the prior condition may be computed based on one or more of: image metadata, time stamp, information extracted from the image's content. In examples, the information extracted from the image may comprise the time of the day, weather, luminosity, backlight, movement of the camera, and/or hazing. In examples, the information extracted from the image may comprise high-level image statistics involving moments, gradients, and/or color space histograms. Alternatively or additionally, extracting the information from the provided image may comprise training an external deep network, for example an autoencoder for manifold learning, and/or a generative adversarial network.

The method of machine-learning may further comprise determining, based on the prior condition, whether the one or more images are to be provided to the first and the second model. In other words, the prior condition may be a(n) (automatic) determining criteria whether a provided image from the first stream is to be used in the on-the-fly adaptation, i.e., updating the one or more parameters, of the second predictive model. The method of machine-learning may only provide the image and perform the adaptation steps if the criteria is passed. This forms an improved training and distillation process of the second model by considering the need of updating the parameters based on the context of the input (training) data. In examples, the determination may be further based on the metadata of the second predictive model. The model's metadata may comprise the time of the last training/calibration, on which context it has been (so far) trained (e.g., on what weather, with a lot or few people in the provided images, luminosity, weather, density, backlight, and/or movement of the camera), and/or a (so far) accuracy of the second predictive model compared to the first predictive model. The metadata of the second model may be considered dynamically, i.e., based on the so far number of provided images to the second model during the on-the-fly adaptation.

The method of machine-learning may further comprise adjusting the computed cost function based on the prior information and updating the one or more parameters of the second predictive model based on the adjusted cost function. In other words, the method of machine-learning may perform the updating step (S146 in FIG. 1) based on an adjusted cost function. In examples, adjusting the computed cost function may comprise weighting the respective first prediction by a first factor and/or weighting the respective second prediction by a second factor then recompute the cost function. Alternatively or additionally, adjusting the computed cost function may comprise weighting the computed cost function by a third factor. In examples, any of the first, second, and third factors may be determined based on the prior condition.

Back to FIG. 3, further examples of the method of machine-learning are now discussed.

The method may optionally obtain a confidence assessment T by any known methods in the field of machine-learning. In examples, the confidence map may be based on the predictions of the teacher model $T_\psi$, denoted by $$\tau(T_\psi(I_v^t)).$$

In examples, the confidence map may serve as an additional determining criterion used to select the most relevant images, or fractions of images, to be provided to the model for the on-the-fly training. This results in an improved training process by improving the accuracy of the trained student model $S_\phi$.

In particular examples, updating the student model may be represented as the following optimization:

$$\phi_v = \text{argmax}_\phi L(S_\phi(I_v^t), T_\psi(I_v^t), \tau(T_\psi(I_v^t))),$$

where L denotes any of standard loss functions known in the field of optimization and machine learning (e.g., L1 or L2). Examples of prediction tasks obtainable from image processing with the method of machine-learning are now presented.

In examples where the prediction task is object detection, each student model may be any of region-based models and dense models. Output predictions for the latter case contain a 1-dimensional confidence map, several size/offset maps, and C-dim class maps, where C denotes the number of classes. Such architecture can be trained upon optimization of L1, L2 or cross-entropy losses, focal loss, or combination thereof. In such examples, T may be defined as a thresholding operator based on the teacher's confidence map, that is used to highlight the positive and negative examples for detection.

In examples where the prediction task is semantic/instance/panoptic segmentation, each student model may involve architectures similar to object detection models and by optimizing very simple loss functions such as per-pixel cross-entropy. The thresholding operator T may be defined over raw class predictions or logits and/or entropy.

In examples where the prediction task is classification, the classification may be performed by an application of hyper-specification, as the distillation loss can be applied directly between the logits of the teacher and the student models. Optionally, another object detection model may be used to pre-emptively select the relevant objects (e.g. face or person region of interest).

In examples where the prediction task is regression which aims at modelling continuous attributes from an image, e.g., face landmark localization or head pose estimation, body pose estimation (framed as a multi-landmark objective), age estimation, or facial action unit intensity prediction, an object detection model may be used to select the relevant regions of interest prior to applying regression, and the distillation may be applied on standard metrics such as L1, or L2 losses.

In examples where the prediction task is object tracking/re-identification, the deep models may be generally used to transform an input image into an embedding representation that is invariant to viewpoint/illumination/noise. These algorithms may be usually trained using metric learning techniques such as triplet loss, by pulling together images of the same object, and pushing away in metric space images of different objects. For hyper-specification, given images from a video stream, positive and negative triplets can be identified by thresholding the distance between embeddings provided by the teacher network. Additionally, "virtual" positive examples may be generated by augmenting the detection bounding boxes, e.g. with scale and jittering augmentations.

In examples, the models for image enhancement or domain adaptation of the prediction task may comprise encoder/decoder architectures, similarly to object detection or semantic segmentation models. Examples of such tasks may involve super-resolution or domain adaptation to alter the color/style of the input images (e.g., from near infra-red or grayscale to RGB images, removing specific noise or compression patterns). These models may be optimized using combinations of adversarial loss, possibly at multiple scales or perceptual loss. In such a case, the availability of a pre-trained teacher transforms the problem into a convenient matched image-to-image translation problem.

The method of inference according to the present disclosure comprises providing one or more predictive models each trained according to—at least one of the examples and embodiments of—the method of machine-learning according to the present disclosure. The one or more predictive models may share a prediction task thus forming an ensemble of predictive models for the shared prediction task. By sharing a prediction task among several predictive models it is meant the at least one particular prediction task, hereinafter called shared prediction task is derivable from the prediction task of any of the one or more predictive models. Each of the one or more predictive models of the method of inference may have been trained for a particular context, i.e., a shared specific context of the provided context-based images of the corresponding method of machine-learning. Thereby the ensemble of the models may comprise one or more models each being specialists for a respective specific context, for example according to the example discussed above in reference to FIG. 3. The respective first predictive model provided to the training method for a model of the ensemble (i.e., the corresponding teacher model based on which the model is trained according to the disclosed machine-learning method) may be different from the respective first predictive model provided to the training method for another model of the ensemble. The predictive models of the ensemble may have been trained sequentially one after another or in parallel. As known per se in the field of machine-learning an "inference" by a predictive model is application of the trained model to an input (e.g., an image) to obtain a prediction.

The method of inference further comprises providing a context-based image from a second stream of images. In examples, the second stream of images may be the same as the first stream of images, for example the succeeding frames after stopping the on-the-fly adaptation based on the first stream of images. In other examples the second stream of images may be different from the first stream, for example being provided by a different optical sensor (e.g., video camera).

The method of inference further comprises obtaining one or more predictions. Each prediction is obtained by applying one of the one or more predictive models to the provided image. In examples, at least a subset of the one or more predictive models may be applied to the provided images to obtain corresponding prediction.

The method of inference further comprises computing one or more weights, each weight being computed for one of the one or more predictions. The computed weight for a prediction may signify importance/relevance of the corresponding prediction. The computed weight may be a tensor, for example a matrix (i.e., a second-order tensor), a vector (i.e., a first-order tensor), or a scalar (i.e., a zeroth-order tensor). Alternatively or additionally, the computed weight may be local, i.e., the weight may be computed locally for a part or a fraction of the provided image, for example the image may be divided into parts and one or more weights are associated with one or more of the parts of the image. In examples, each local computed weight may be stored as an element of a tensor.

The method of inference further comprises computing a prediction from a combination of the one or more predictions and their respective one or more weights. In examples, the combination of the one or more predictions and their respective one or more weights may be a linear combination. In particular, the linear combination may be a weighted average of the one or more predictions each weighted by the respective weight. In other examples, the combination of the one or more predictions and their corresponding one or more weights may be the prediction corresponding to a maximum value of the one or more computed weights or prediction with a maximum value among the one or more predictions. The maximum value—of the one or more computed weights or the one or more predictions—may be considered according to any norm or metric in the field of machine-learning.

Combining the predictions obtained by an ensemble of predictive models are known as ensembling method in the field of machine-leaning. The method of inference according to present disclosure forms an improved method of inference by employing an ensemble of predictive models and computing a weight for prediction of each model such that adaptively controls its effect on the final result. Each model may a hyper-specialized model (trained by the machine-learning method using a first predictive model, i.e., a teacher model) thus the ensemble of smaller (student) models is capable of outperforming the big teacher models in a variety of contexts accuracy-wise and speed-wise.

The method of inference may further comprise providing a baseline predictive model. A baseline predictive model is a predictive model being trained on at least a dataset and performing at least a prediction task. The baseline method and the one or more predictive models may share a prediction task thus forming an ensemble of predictive models for the shared prediction task. The baseline predictive model may be not trained according to the method of machine-learning discussed above. In particular, the baseline predictive model may not be trained according to the example of hyper-specification process discussed above in reference to FIG. 3. In particular examples, the baseline predictive method is trained on a generic dataset.

The method of inference may further comprise obtaining, for the image provided from the second stream, a prediction by applying the baseline predictive model to the provided image, and computing a weight corresponding to the prediction obtained by the baseline predictive model. The method may perform the inference based on the prediction obtained by the baseline predictive model and the corresponding weight, and based on the one or more predictions and the corresponding one or more weights. The method of inference may obtain the inference by combining the prediction obtained by the baseline model and the corresponding weight, as well as the prediction(s) obtained by the predictive models other than the baseline predictive model, and their respective one or more weights according to any of the combinations discussed above.

The computing one or more weights, each weight corresponding to one of the one or more predictions and the computing a weight corresponding to the prediction obtained by the baseline predictive model may further comprise computing a prior condition from the prior information of the provided image. Each prior condition may be computed based on the prior information of the provided image and/or the metadata of the model corresponding to the weight according to any of the examples discussed above. In examples, the prior condition may be computed based on one or more of: image metadata, time stamp, information extracted from the image's content. In examples, the information extracted from the image may comprise hour of the day, weather, luminosity, backlight, movement of the camera, and/or hazing. Alternatively or additionally, the information extracted from the image may comprise high-level image statistics involving moments, gradients, and/or cooler space histograms. Alternatively or additionally, extraction the information from the provided image may comprise training an external deep network, for example an autoencoder for manifold learning, and/or a generative adversarial network.

The method of inference may further comprise providing a reference predictive model. The reference predictive model may be a generic model. In examples, the reference predictive model may be one of the first predictive model(s) provided to train each of the one or more predictive models. The computing the one or more weights, each weight corresponding to one of the one or more predictions, and/or the computing the weight corresponding to the prediction obtained by the baseline predictive model may comprise computing a posterior condition. The computing a posterior condition may be based on one or more of the following: the prediction of the predictive model corresponding to the weight; and/or a prediction obtained by the reference predictive model for the provided image. In examples, the posterior condition may be computed based on a confidence assessment for the provided image. The confidence assessment may be computed based on the reference predictive model. In example, the posterior condition may be a function of one or more (e.g., all) of the computed prior conditions.

Using the posterior condition may provide an improved method of inference, as the method may adapt the influence of a given predictive model of the ensemble of predictive models in the prediction by assessing the prediction result of the given model and adjusting the respective weight.

In examples, the provided baseline predictive model may be trained according to the method of machine-learning.

Figure 4A:
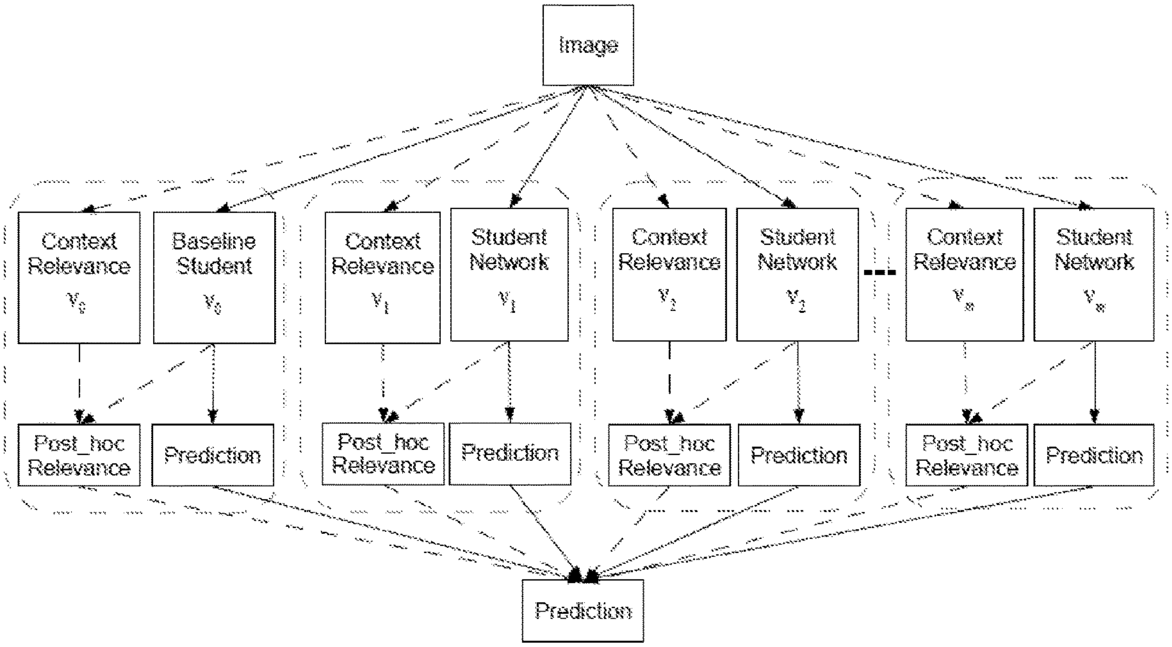
FIGS. 4A-F show examples of adaptive ensembles of hyper-specialists.

Examples of methods of inference (also equivalently referred to as ensembling methods) are now discussed in reference to FIG. 4A.

An ensemble of m predictive models is presented in FIG. 4A, among which a baseline model (the model on the left). The trained specialist models may be denoted as $$\{S_{\phi_{v_i}}\}$$

for i=1, . . . , m and the baseline method mat be denoted as $$S_{\phi_{v_0}}.$$

Similarly, $v_0$. and $\{v_i\}$, i=1, . . . , m may denote the contexts of the baseline and hyper-specialist models, respectively. A prior context relevance $$R_{v_i}^{prior}(I)$$

may be computed from image I for each context $v_i$ as the prior condition. In particular, $$R_{v_i}^{prior}$$

may include simple high-level image statistics or training an external deep network as discussed above. (e.g., involving moments to consider the affinity of the image I with context $v_i$). A post-hoc relevance metric $$R_{v_i}^{post}(I)$$

as a posterior condition may be computed as follows based on the each of the predictive models and the context relevance:

$$R_{v_i}^{post}(I) = f\left(R_{v_0}^{prior}(I), S_{\phi_{v_0}}(I), \ldots, R_{v_m}^{prior}(I), S_{\phi_{v_m}}(I)\right).$$

In examples where the shared prediction task is object detection and if the (shared) prediction task of $$S_{\phi_{v_i}}$$

is an object detection model that contains a confidence map, function $f$ may be a multiplication opera or between the prior context relevance and this confidence map. This post-hoc relevance of each student indexed by i is then used to weight the prediction of each student prior to summing them to form the final prediction (prediction 401 in FIG. 4A). Another special case is the "winner-takes-all" ensemble, where $f$ denotes the maximum operator between all the post-hoc relevance measurements. Additionally, if I is an image of a video stream, and the prior context relevance or the post-hoc relevance for past frames lies under a specific threshold for one or more contexts $\{v_i\}$, i=1, . . . , m, the corresponding students can be deactivated to reduce computational runtime.

Some variations of the example of ensembling method depicted in FIG. 4A are presented now.

Figure 4B:
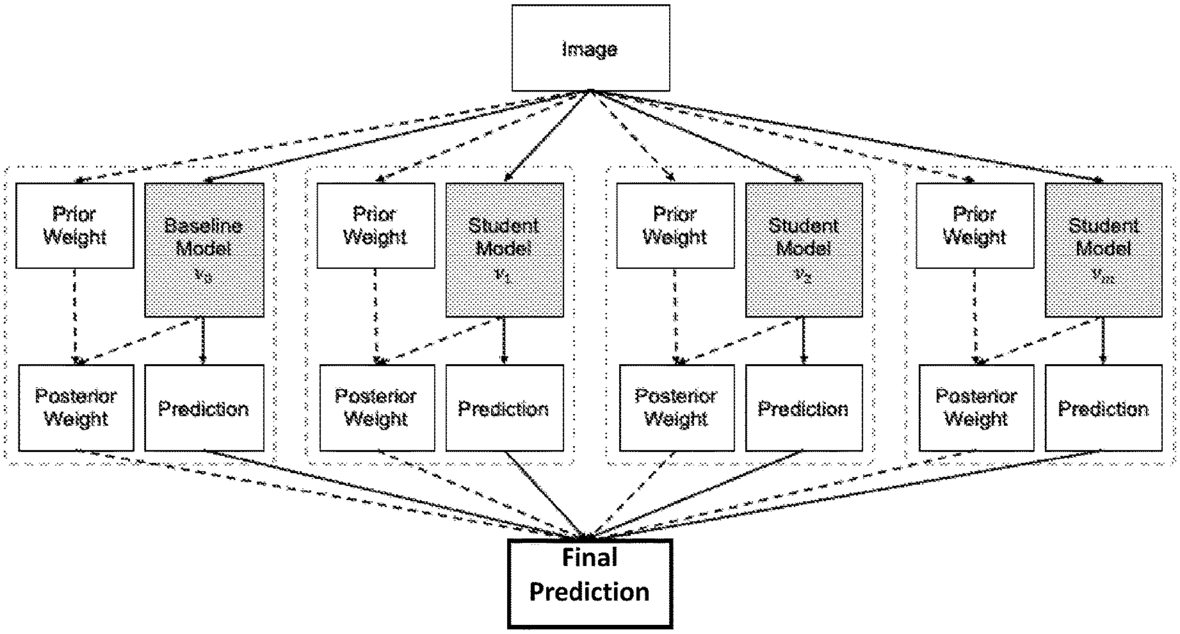

FIG. 4B presents a similar example as of FIG. 4A by some alternative notations. The context relevance of FIG. 4A (i.e., as the prior condition as discussed above) is equivalently called prior weight, the post-hoc relevance of FIG. 4A (i.e., as the prior condition as discussed above) is equivalently called posterior weight, and the prediction 401 of FIG. 4A is equivalently called the final prediction.

Further variations of the example of ensembling method depicted in FIG. 4B are now discussed in FIGS. 4C-F using the notation of FIG. 4B.

Figure 4C:
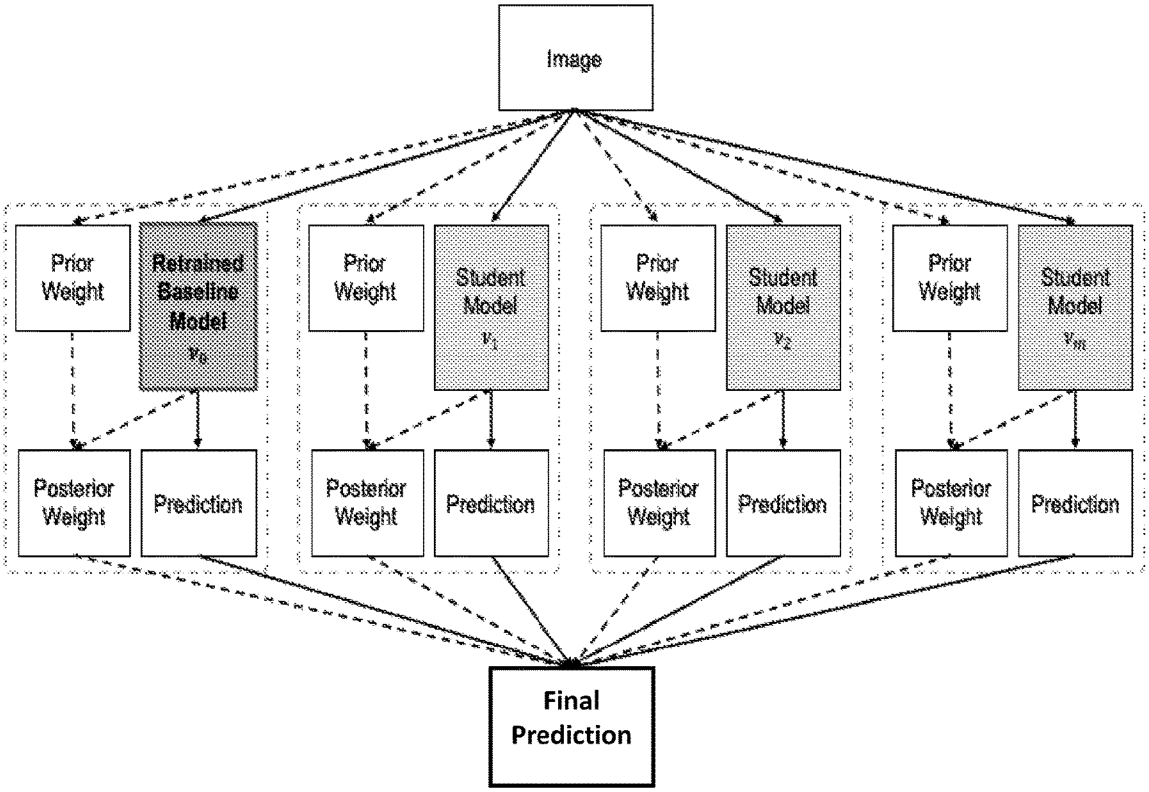
Figure 4D:
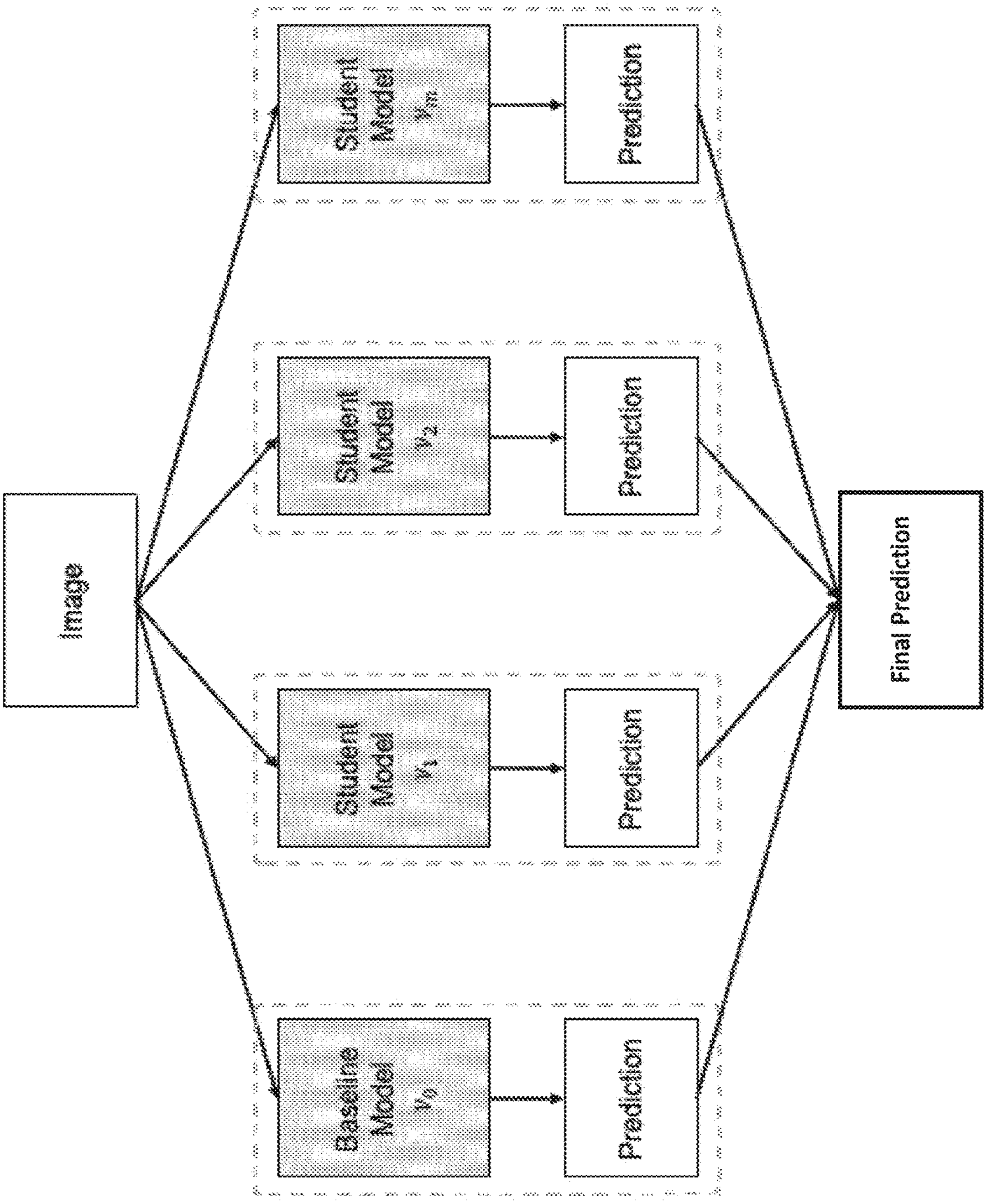
Figure 4E:
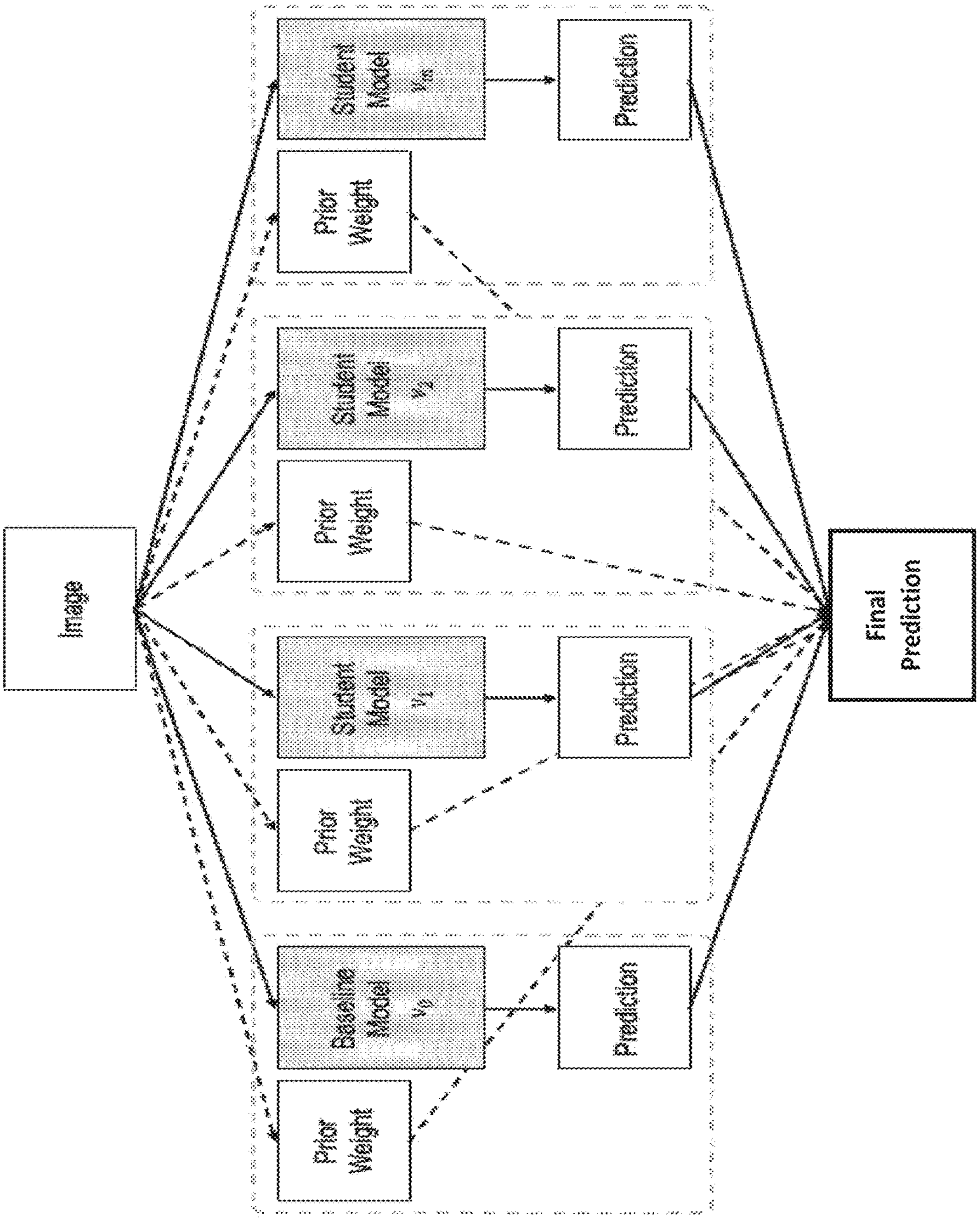
Figure 4F:
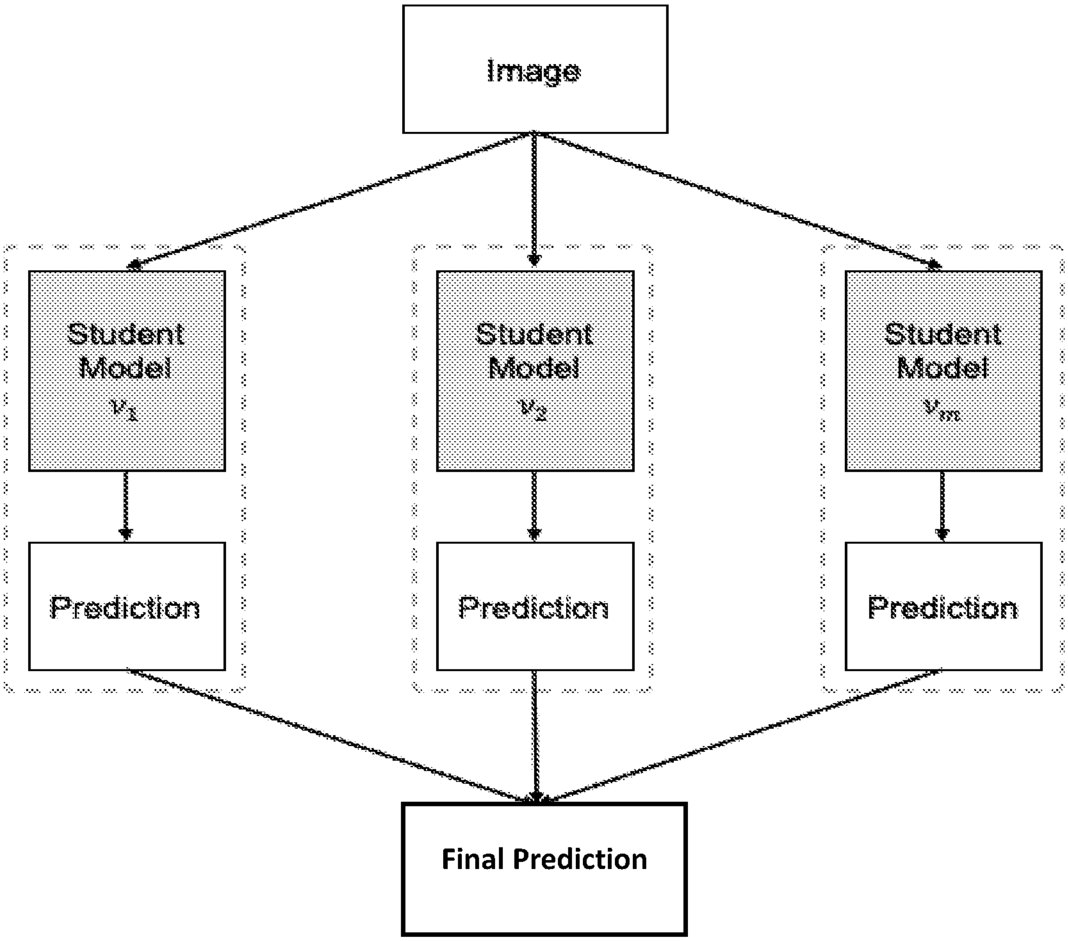

A variation in which the provided baseline predictive model is re-trained is provided in FIG. 4C. Another variation in which no prior or posterior condition is computed is provided in FIG. 4D. Another variation in which a prior condition is computed but no posterior condition is computed is provided in FIG. 4E. Another variation in which no prior or posterior condition is computed and no baseline predictive model is provided to the ensembling method is provided in FIG. 4F.

A processing machine according to the present disclosure comprises a first interface configured to receive a stream of images from an optical sensor. The interface is shared boundary across which two or more separate components (hardware or software) can exchange information. The images of the stream of images are context-based. The processing machine further comprises a data storage unit configured to store one or more predictive models each trained according to the method of machine-learning. The data storage unit may additionally store metadata associated with some (e.g., all) of the one or more predictive models. The metadata of each model may comprise the context on which the model have been trained. The processing machine further comprises a processing unit configured to perform one or more methods of machine-learning. In examples, the processing machine may perform one or more methods of machine learning as discussed above in order to train, calibrate, re-train, and/or re-calibrate any of the predictive models stored on the data storage unit. The processing unit is further configured to perform a method of inference by providing one or more of the one or more predictive models stored on the data storage unit. The processing unit may perform the method of inference on the images received from the optical sensor. In examples, the processing machine is a local machine. In examples, the data storage unit may be a cloud storage.

In examples, the storage unit of the processing machine may store one or more predictive models as the teacher models. The teacher models may be an ensemble of predictive models and may be trained by a method of machine-learning according to the present disclosure, or any known method in the field of machine-leaning. The processing machine may employ any of the one or more teacher models to re-train other predictive models stored on the storage unit. The processing machine may not provide the one or more teacher models to the method of inference.

The processing unit of the processing machine may be further configured to re-train one or more of the one or more predictive models stored on the data storage unit; and select one or more of the one or more predictive models stored on the data storage unit and to perform the method of inference on the selected one or more predictive models. The processing unit may select the provided one or more predictive models based on some criteria, for example based on the context of the image of the received stream of images and the stored metadata of the predictive model(s). In examples, the processing unit may first re-train the predictive model(s) provided to the method of inference and only after re-train the other predictive model(s) stored on the date storage unit. The processing unit may re-train the other model(s) stored on the date storage unit only if a criterion is not passed, for example if the context of the received images does not match the context stored in the metadata of the provided predictive models to the method of inference. The processing machine may perform the method of machine-learning to re-train the predictive models in parallel to performing the method of inference.

In examples, performing the re-training may depend on a condition. The condition may be one or more of: the comparison of the actual and target (i.e., ideal) runtimes of the inference, the heat of the local hardware, and/or contextual metadata such as weather, time of the day, environmental lighting, and so on. In examples, the re-training may be only performing the calibration phase.

The processing machine may further comprise a second interface configured to connect with one or more repository. The repository is a data storage location. The processing unit may be further configured to store on the repository the one or more predictive models of the data storage unit if a first condition is satisfied; and retrieve one or more predictive models stored on the repository on the data storage unit if a second condition is satisfied. In examples, the first and/or second conditions may depend on timestamp, time between two sendings and/or changes of the context (weather change, luminosity, haze, etc.). In examples, the one or more predictive models stored on the repository may be a superset of the one or more predictive models stored on the data storage unit.

A system according to the present disclosure comprises one or more processing machines, and one or more optical sensors. Each optical sensor is connected to one or more of the one or more processing machines for sending context-based images from a third stream of images.

The embodiments of the processing machines and systems according to the present disclosure form an improved solution as they are totally real-time and privacy compliant as the images are processed on-the-fly, both for inference and hyper-specification, and never stored or sent to the cloud.

In examples, the system according to the present disclosure may serve as an ensembling of predictive models. Such a functionality is realized by providing a received image by one of the optical sensors of the system may to an ensemble (e.g., all) of the processing machine of the system. This may be coordinated by a controller of the system, e.g., a CPU. Then, each processing machine may serve as a predictive model, thereby obtaining a prediction according to any of examples and embodiments of the method of inference discussed above.

This forms a further improvement as it enables the system to obtain the prediction based on a larger group of predictive models in form of ensembling. As each of the processing machines may be connected to a different optical sensor which may provide images of different contexts (e.g., different angles, or luminosity), each processing machine may be more specialized for a different context of images. Thus, the ensembling of the processing machine provides more robust and accurate predictions.

Figure 5:
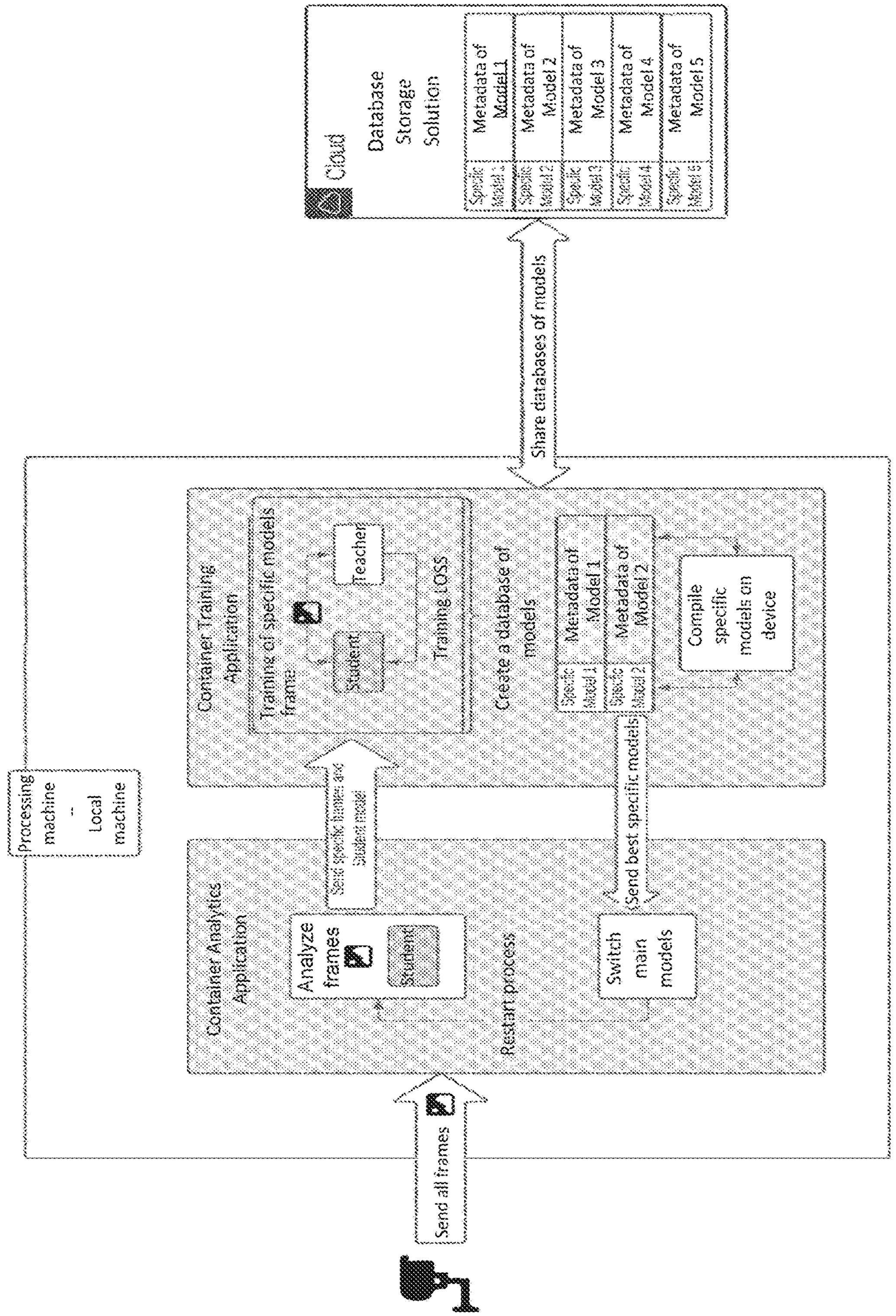
FIG. 5 shows an example of an on-device architecture for joint inference and in-situ hyper-specification.
Figure 6:
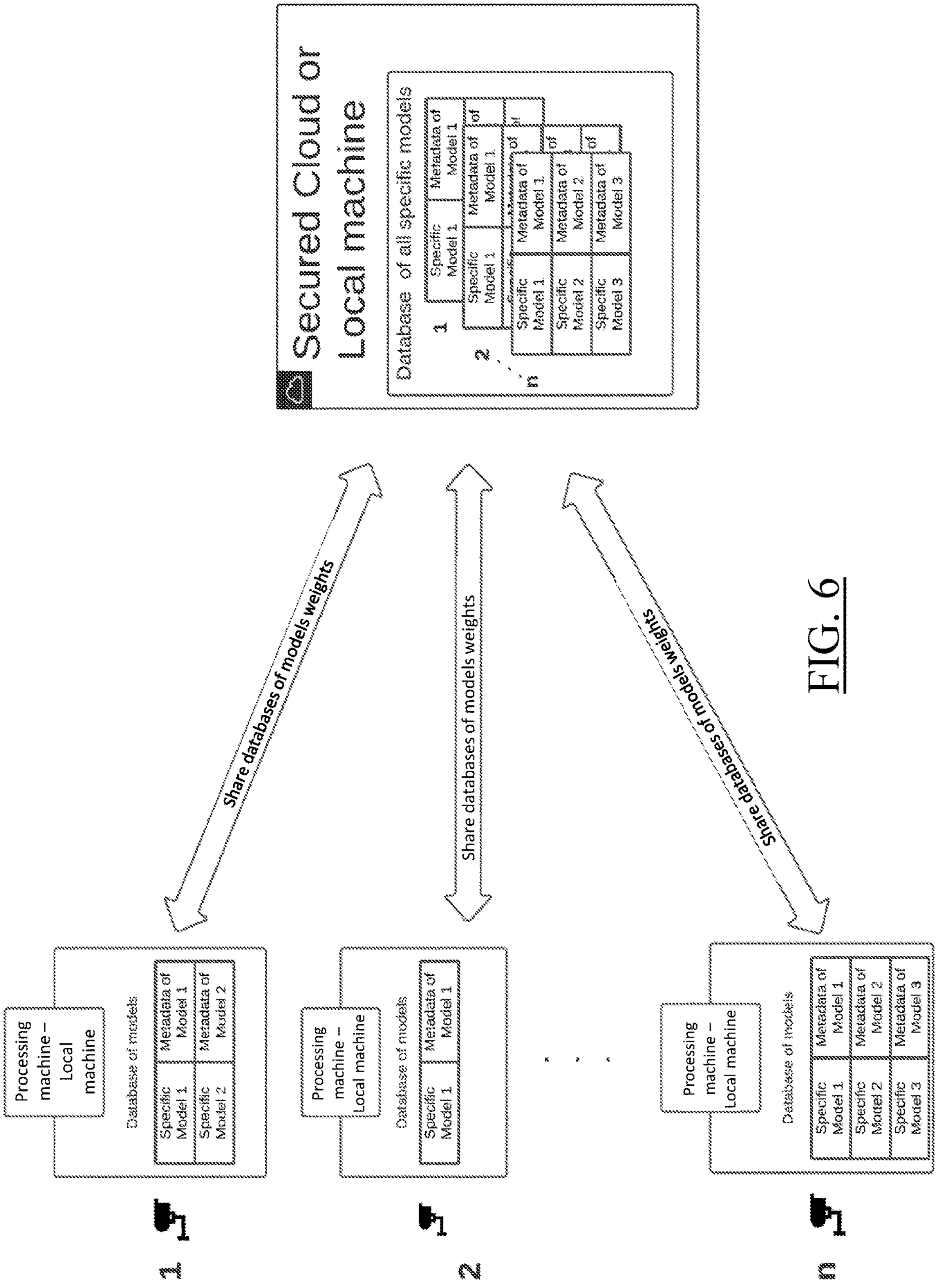
FIG. 6 shows an example of a client-server architecture for model gathering and dispatching.

Examples of the processing machines and systems according to the present disclosure are now discussed in reference to FIGS. 5 and 6.

FIG. 5 shows an example of an on-device architecture for in-situ hyper-specification of deep neural networks according to the embodiments of the processing machine discussed above. of deep neural networks. This software architecture uses main software (containers) that runs on the same machine. The two containers may not be a physically separated and merely used for the explanation purpose. In the first container, deemed the analytics container, a deep model may perform inference on subsequent frames captured by a video stream. Periodically, this container may send the image to the other container, named the training container, in which the hyper-specification process may run, according to the embodiments discussed above, for example by performing SGD updates over the stream of images and involving an expensive call to a locally-stored teacher model. The frequency at which this process is called may vary depending on several factors, including, but not limited to, the actual and target runtimes of the inference in the first container, the heat of the local hardware, or contextual metadata such as weather, time of the day, environmental lighting, and so on. Additionally, a measurement outputted by the current network such as the post-hoc relevance (as a posterior condition) may be used as discussed above. The parameters of the hyper-specific student models are stored on a local database along with specific metadata (e.g., time of creation, accuracy compared to the teacher, context, luminosity, weather, density, backlight, movement of the camera).

Periodically, the models may be sent to a repository or storage solution (secured cloud or local machine) in order to globally gather hyper-specific model weights for the ensembling of predictive models. Alternatively or additionally, periodically, the models may be swapped from the training container towards the analytics container to use the latest available hyper-specific models.

It is now discussed an example of operations performed by a processing machine as discussed above. Firstly, context-based images are provided to the on-device architecture through an interface. The context-based images are provided by an optical sensor, e.g. a camera. The context-based images may be provided from a real-time process from live camera. The interface may be any interface able to transfer images captures by an optical sensor to a processing machine. Then, one or more or all images of the video stream are provided to the analytic container and/or the training container. Thus, there may be a duplication of the image transmitted when both containers received a same image. Based on the received images, the processing unit of the processing machine decides if the predictive model(s) on the analytics container (i.e., already provided to the method of inference) should be deployed. The decision may be made based on the match between the context of the received images and the context stored in the metadata of models on the analytics container, a prior condition computed from the received images, or a posteriori condition based on one or more previous predictions. The processing unit may update the ensemble of the predictive models on the analytics container, by replacing some (e.g., all) of the models on the analytics container by some models stored on the storage unit, and/or re-training some (e.g., all) of the models on the analytics container by performing machine-learning method on the training container. The update may be performed periodically, for example after receiving each 1000 images, or each 10000 images, in order that the on-device performance will be computationally efficient. Further, the update may be performed based on the change of the context of the received images, for example by changing light (i.e., luminosity) during the day. The processing machine also re-train the models on the training container by performing the method of machine-leaning. The teacher model in the method of machine-learning is one of the teacher models stored on the storage unit. The re-training process may be performed in parallel to the inference process.

The processing machine is connected to a repository via an interface. The interface may be any interface able to transfer and/or synchronize the data corresponding to the predictive models, including teacher models. The processing machine may share the predictive models with the repository, i.e., by appending or updating the models stored on the storage unit by some models from the repository. Alternatively or additionally, the models of the storage unit may be stored on the repository, i.e., update the repository. The processing machine may update the storage unit or the repository periodically or whenever an update is available on the repository or the storage unit. The processing machine does not send any date regarding the received image to the repository and only the trained models and their associated metadata may leave the processing machine.

FIG. 6 presents an example overview of the software architecture for ensembling and dispatching the models on local devices according to the embodiments of the system discussed above. A system may comprise n local (or equivalently client) machines (e.g., each according to the processing machine described in reference to FIG. 5) that share information with a distant storage solution server (a secured cloud or a local machine). The system further comprises n optical sensors, each optical sensor being connected to one of the local machines. Periodically, models may be sent from each local client to the server, where they are stored in a specific model database along with associated metadata, regarding the context they originate from (e.g., the camera viewpoint) as well as information related to this viewpoint (e.g., the time of the day in which they were last updated, weather conditions) or high-level semantics extracted from this model (distributions ranges, density of objects for object detection methods, and so on).

Periodically, subsets of these archived models may be swapped on the client machines, e.g., depending on the affinity between (e.g., locally) measured metadata of the stream received by the respective optical sensor of the client machine and the metadata of the models stored in the database, and in relation with the ratio between the computational burden of each of these models and the power of the client machines. The affinity signifies the match between the context of the provided images and the context to which the model is adapted/trained (e.g., hyper-specialized) and may be determined based on computing a prior condition, and optionally further based on the metadata of the predictive models as discussed above. This swapping may allow to dynamically use well-adapted ensembles (such as winner-takes-all ensembles discussed above) that allows to find good compromise between execution runtime and statistical performance (e.g., in mean average precision and/or mean average recall). In addition, on each client locally, the metadata downloaded from the server may be used as a form of prior context relevance metric for better local adaptive ensembling.

Implementations of the methods and some results obtained by said implementations are now discussed with reference to FIGS. 7 to 15.

In the implementations, the average mean precision (mAP) of the hyper-specific students against the teacher model on 1000 held-out images directly after the last sequence (200 k consecutive frames) upon which the model was distilled is measure. The implementations are performed six videos with different contexts (urban, beach, ski resort, day/night). As the videos mainly contain examples of class person, only report mAP for the person class is reported. Results are showcased on FIG. 7 relative to a baseline method.

Figure 7:
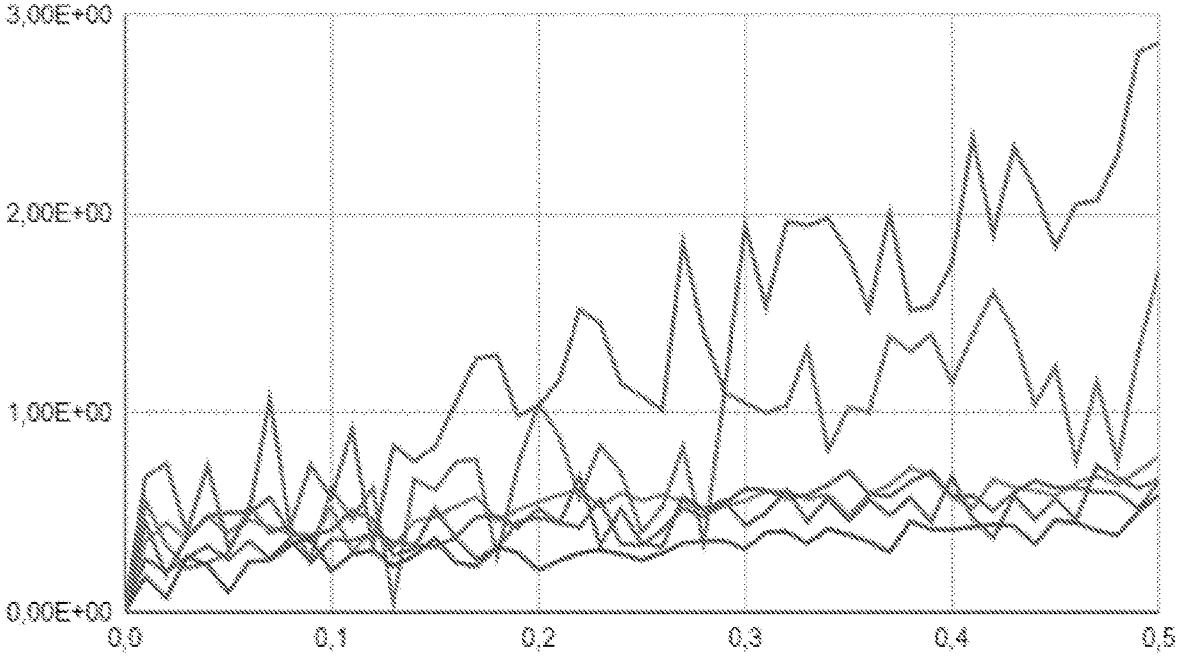
FIG. 7 illustrates mean Average Precision over an on-the-fly adaptation of a model according to the method.

The results of FIG. 7 show the relative improvement versus time and indicate a significant improvement of the model mAP (between, 60% and 289%) over the time of video used for training for each of six videos. In the results presented on FIG. 7, as the teacher model is used as the ground truth annotation on the videos, the student manages to overfit on the teacher's prediction and, to a certain extent, to generalize on a subsequent time frame on the clip.

Figure 8:
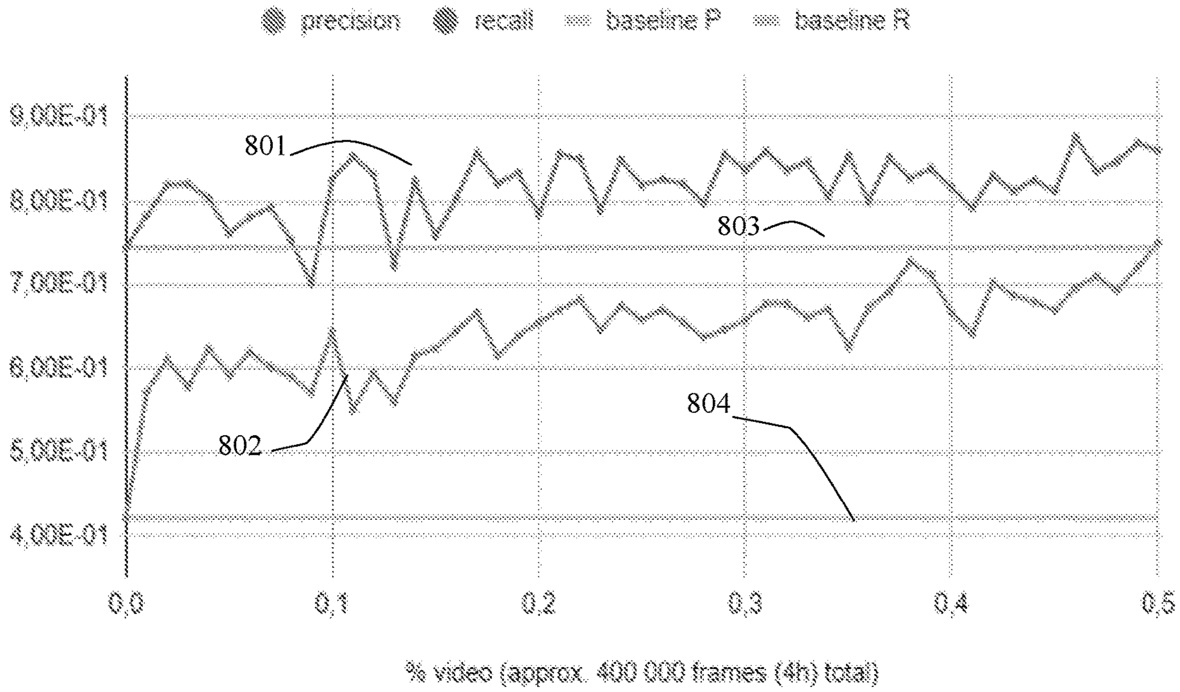
FIGS. 8-9 illustrate an example of specialization on one video-clip.
Figure 9:
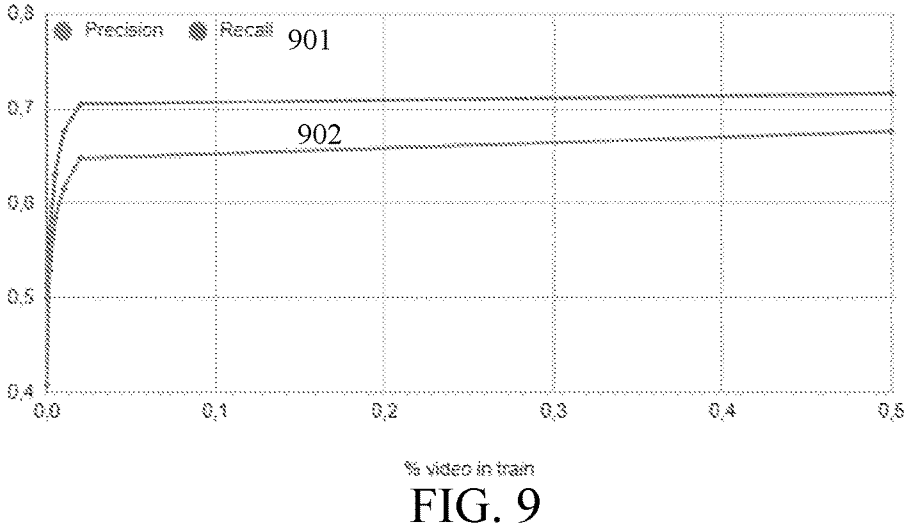

FIGS. 8 and 9 shows an example of specialization on one video-clip. FIG. 8 presents the long-term domain specialization recall 801 and precision 802 versus the baseline values of the recall 803 and the precision 804, respectively. In this example the train time intervals are directly adjacent to the test time intervals (e.g., [0.498, 0.5] and [0.5, 0.502] for the train interval and the test interval, respectively). The plots for mAP (and mean average recall (mAR) are similar and in both cases, the metric goes up quickly (up to some minor instability) then slowly, steadily increases with time. FIG. 9 shows the recall 901 and precision 902 that the longer the student model be trained on one specific video, the higher the mAP/mAR. The results show that the specification of the student model occur very quickly but steadily continues over time, the so-called long-term specification.

The results of FIGS. 7, 8, and 9 show that the long-term specification may persist if the test interval becomes closer and closer to the train interval. Thus learning dynamics of hyper-specification may be as follows: First, a short-term specialization (approx. 10 k frames or optimizer steps) in which the adaptation is likely due to gradients backpropagated to the shallower (close to the output prediction layers) layers, which restraints the semantic prediction range of the network. The first step may be referred to as the calibration or on-the-fly short term adaptation step as discussed above.

Second, a long-term (approx. 100-200 k frames or optimizer steps) specialization which adapts deeper (close to the input images) layers, which adapts the feature extraction and image transformation layers of the network for domain specialization.

Figure 10:
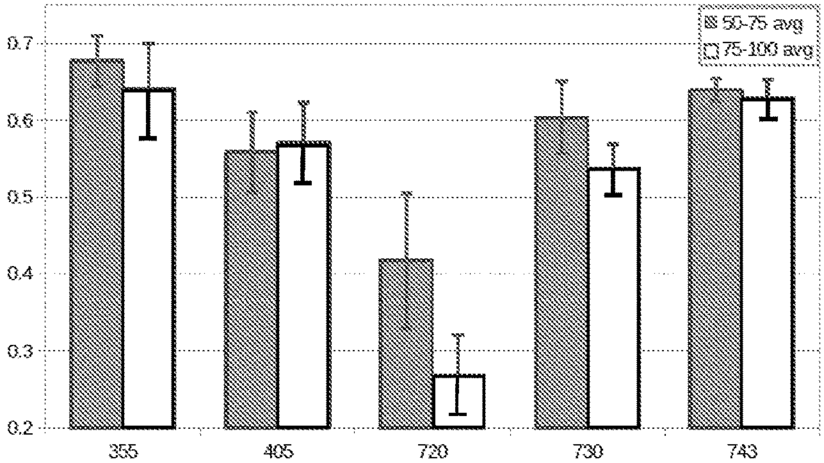
FIGS. 10-11 illustrate assessment of inter-video specificity.
Figure 11:
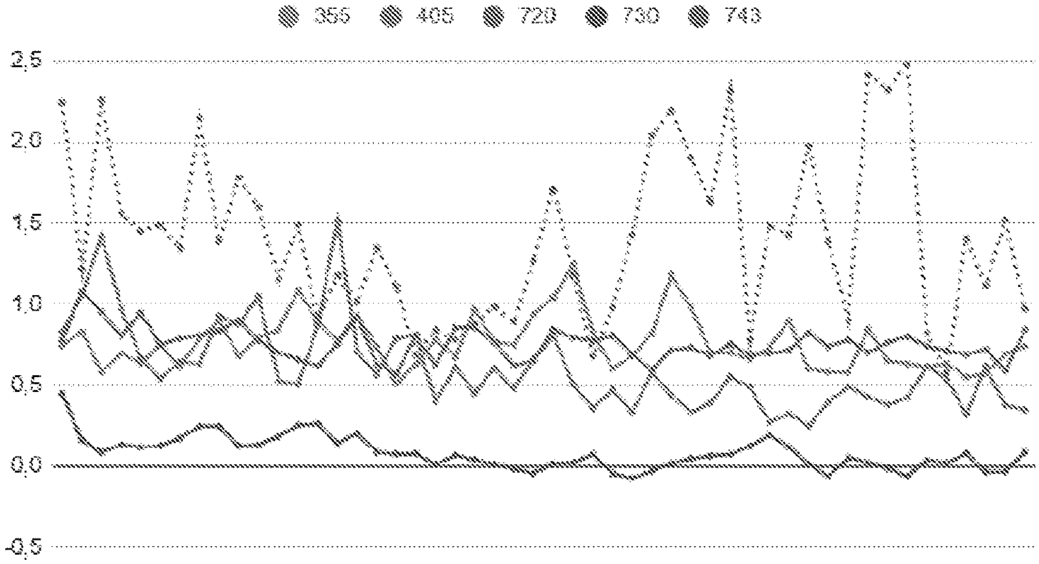

In reference to FIGS. 10-12, the degree of specialization of the hyper-specific student deep learning models is discussed. The degree of specialization is measured in two contexts: intra-video specificity, i.e., how specific are the student models for one given viewpoint/video clip, which will, in a deploy situation, influence how frequently re-training/re-calibration of the models is needed; and inter-video specificity, i.e., how context-specific are these students.

The intra-video specificity is assessed and the results are presented in FIGS. 10-11. The mAP of a model is computed on 50 different time intervals more or less adjacent to the train time interval for five different videos. FIG. 10 presents the box plots of the mAP for each video wherein the boxes on the left (gray) present the results for 25 test points closer to train interval, and the boxes on the right (white) present the results for 25 test points further to train interval. FIG. 10 shows that mAP is a bit lower on average for the 25 test intervals further to the train interval, but the difference is not very statistically significant, except on video #720, but this is due to very poor performance of the teacher. This effect may be seen in the computed relative mAP in FIG. 10 for the video #720 as the poor teacher performance causes instability in the normalization process.

FIG. 11 presents the relative mAP for each of videos overtime. Overall, the results of FIG. 11 show a very slight downwards trend which indicates that, in the absence of very quick context change (e.g., quick illumination bursts or weather changes), it is not mandatory to retrain the students very frequently.

FIG. 12 shows the results of assessment of the inter-video specificity by testing the hyper-specialist student models in matched/mismatched contexts, i.e., the match between the context of the provided images and the context to which the student is hyper-specialized. FIG. 12 shows the scores obtained by training a student model on one video (row index) and testing on another (column index), with comparison between the baseline model (left) or the hyper-specialists (right).

As can be seen on the right, hyper-specialists are generally far better than the baseline only when the train/test videos are matched (on the diagonal), and significantly worse elsewhere. Furthermore, on the reference MSCOCO dataset, the hyper-specialists have only 0.11-0.353 mAP for class person, which is significantly under the baseline 0.573 mAP. This confirms that the students work as intended: by forgetting their former domain and semantic prediction range, they learn to focus on their respective contexts.

The precision of ensemble models composed of the baseline student model and six hyper-specific students is assessed. Several setups have been evaluated. In the first one, deemed inclusive cross-validation, all the students are evaluated on all videos. Thus, it assesses the capacity of the ensemble to filter out the irrelevant hyper-specialists.

FIG. 13 shows the results obtained for the inclusive cross-validation setup. In addition to the two baselines (by using the baseline, MSCOCO-trained student and manually using the matched hyper-specialist student for each video), two methods have evaluated: Mean confidence (wherein for each pixel, an average the prediction maps of all students is considered) and Max confidence (Winner-takes-all student: for each pixel, only the prediction maps for the student with highest confidence is used). While the mean confidence is generally worse than the baseline student, the max confidence is significantly better and very close to the best specialist baseline. This shows that badly-matched students generally output more spread-out, less picky confidence maps than the most relevant ones, and that the confidence measurement is, in this case, a suitable post-hoc relevance metric for object detection hyper-specialist ensembles.

FIG. 14 shows results obtained for the exclusive cross-validation setup. In this experiment, only hyper-specialists that do not see any image from the considered video clips is selected (i.e. the best specialists are filtered out). A consistent improvement (2.4-16% mAP) on all videos is observed, which indicates that (winner-takes-all) ensembles of hyper-specialists outperforms the baseline model on new data without the need of added supervision. Thus, by filtering out the less relevant students (e.g., using prior context relevance metric or confidence statistics over a few frames as a post-hoc relevance metric), fast and efficient networks may be designed at virtually no cost.

Figure 15:
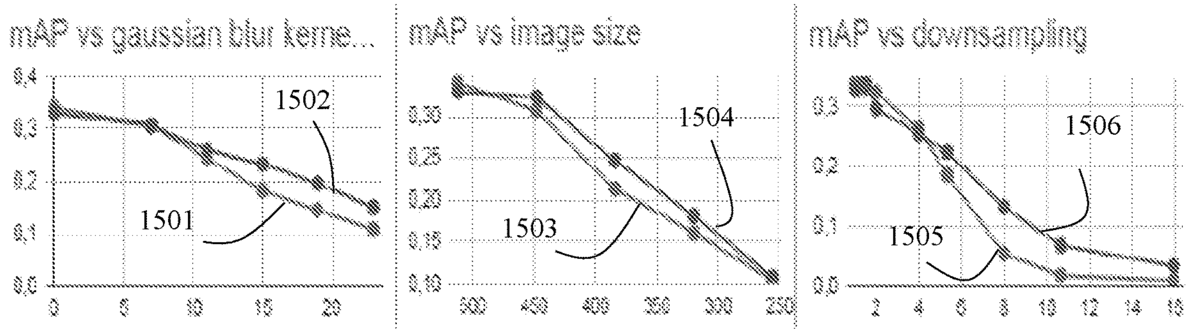

FIG. 15 shows the results obtained with a winner-takes-all ensemble of seven specialists 1502, 1504, 1506 compared with a baseline model on augmented (gaussian blur with increasing kernel sizes (left), smaller images (middle) as well as down sampling augmentation (right)) MSCOCO mini-val set 1501, 1503, 1505. While the mAP of the ensemble lies a little bit lower for the baseline model with no augmentation (left part of the plots), the ensembles are more resilient to test time augmentations.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of the methods may be implemented in software, as an executable program, the latter executed by suitable digital processing devices. More generally, embodiments of the present invention may be implemented wherein general-purpose digital computers, such as personal computers, workstations, etc., are used.

Figure 16:
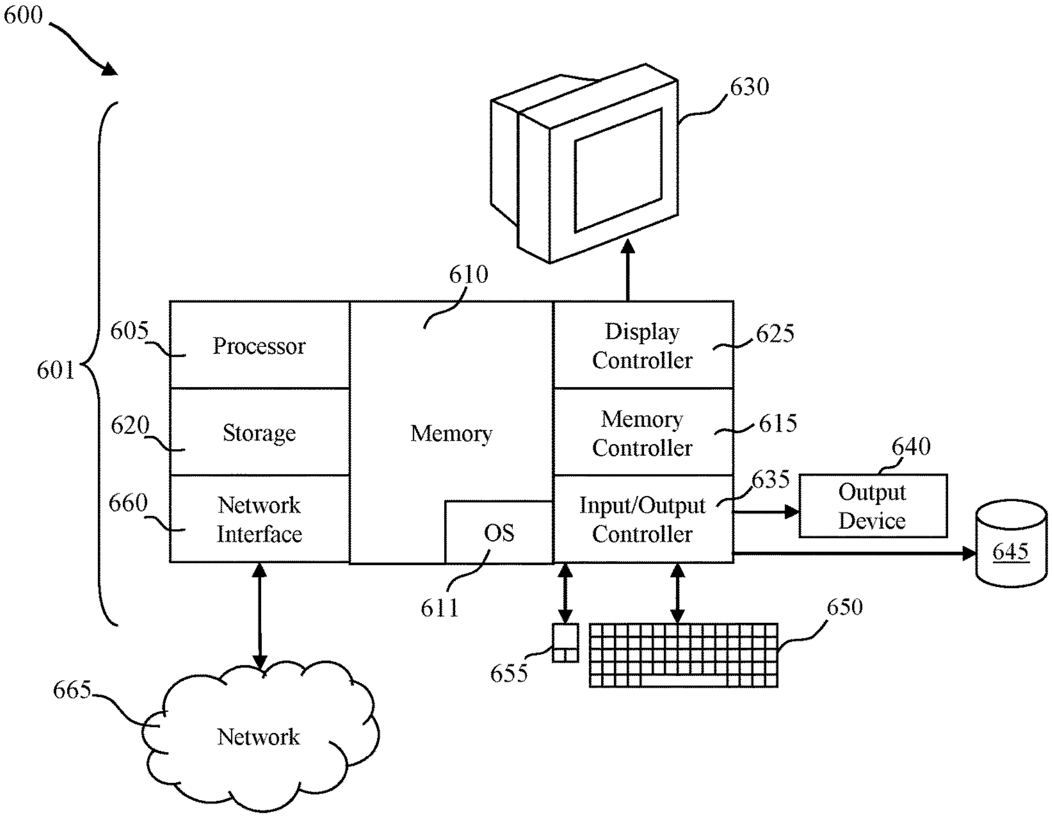
FIG. 16 is an example of a computerized system.

For instance, the system 600 depicted in FIG. 16 schematically represents a computerized unit 601, e.g., a general-purpose computer. In exemplary embodiments, in terms of hardware architecture, as shown in FIG. 16, the unit 601 includes a processor 605, memory 610 coupled to a memory controller 615, and one or more input and/or output (I/O) devices 640, 645, 650, 655 (or peripherals) that are communicatively coupled via a local input/output controller 635. Further, the input/output controller 635 may be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing software, particularly that stored in memory 610. The processor 605 may be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 may include any one or combination of volatile memory elements (e.g., random access memory) and nonvolatile memory elements. Moreover, the memory 610 may incorporate electronic, magnetic, optical, and/or other types of storage media. Note that the memory 610 may have a distributed architecture, where various components are situated remote from one another, but may be accessed by the processor 605.

The software in memory 610 may include one or more separate programs, each of which comprises an ordered listing of executable instructions for implementing logical functions. In the example of FIG. 16, the software in the memory 610 includes a method described herein in accordance with exemplary embodiments and a suitable operating system (OS) 611. The OS 611 essentially controls the execution of other computer programs, it being noted that methods described herein may be partly implemented as application program, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 610, so as to operate properly in connection with the OS 611. Furthermore, the methods may be written as an object-oriented programming language, which has classes of data and methods, or a procedure programming language, which has routines, subroutines, and/or functions.

Possibly, a conventional keyboard 650 and mouse 655 may be coupled to the input/output controller 635. Other I/O devices 640-655 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 635 for further processing. Sensor nodes are ideally small, consume low energy, are autonomous and operate unattended.

In addition, the I/O devices 640-655 may further include devices that communicate both inputs and outputs. The system 600 may further include a display controller 625 coupled to a display 630. In exemplary embodiments, the system 600 may further include a network interface or transceiver 660 for coupling to a network 665.

The network 665 transmits and receives data between the unit 601 and external systems. The network 665 is possibly implemented in a wireless fashion, e.g., using wireless protocols and technologies, such as WiFi, WiMax, etc. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 665 may also be an IP-based network for communication between the unit 601 and any external server, client, and the like via a broadband connection. In exemplary embodiments, network 665 may be a managed IP network administered by a service provider. Besides, the network 665 may be a packet-switched network such as a LAN, WAN, Internet network, etc.

If the unit 601 is a PC, workstation, intelligent device or the like, the software in the memory 610 may further include a basic input output system (BIOS). The BIOS is stored in ROM so that the BIOS may be executed when the computer 601 is activated.

When the unit 601 is in operation, the processor 605 is configured to execute software stored within the memory 610, to communicate data to and from the memory 610, and to generally control operations of the computer 601 pursuant to the software. The method described herein and the OS 611, in whole or in part are read by the processor 605, typically buffered within the processor 605, and then executed. When the methods described herein are implemented in software, the methods may be stored on any computer readable medium, such as storage 620, for use by or in connection with any computer related system or method.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the unit 601, partly thereon, partly on a unit 601 and another unit 601, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not to be limited to the particular embodiments disclosed, but that the present invention will include all embodiments falling within the scope of the appended claims.

The invention claimed is:

1. A computer-implemented method of machine-learning for on-the-fly adaptation of a predictive model configured for image processing, the method comprising:

providing a first predictive model having been configured to provide at least one first prediction task;

providing a second predictive model having been configured to provide a second prediction task, the second predictive model comprising one or more parameters, the second prediction task being derivable from the first prediction task;

providing context-based images from a first stream of images obtained from an optical sensor to both the first and the second predictive models, each provided image being provided just once on-the-fly; and performing an on-the-fly adaptation for the second predictive model, the on-the-fly adaptation comprising, for each provided image:

performing a respective first prediction by the first predictive model and a respective second prediction by the second predictive model for the same provided image;

computing a cost function of the respective first prediction and the respective second prediction for the same provided image; and updating the one or more parameters of the second predictive model based on the computed cost function.

2. The method of machine-learning of claim 1, wherein performing the on-the-fly adaptation for the second predictive model further comprises:

calibrating the second predictive model by performing the on-the-fly adaptation for the second predictive model using a few-shot learning method that is carried out with a limited number of the context-based images obtained, on-the-fly and just once, from the first stream of images.

3. The method of machine-learning of claim 1, further comprising prior to, performing, for each provided image, the respective first prediction and the respective second prediction:

computing a prior condition from prior information of the provided image; and determining, based on the prior condition, whether the one or more images are to be provided to the first and the second model.

4. The method of machine-learning of claim 3, further comprising:

adjusting the computed cost function based on the prior information and updating the one or more parameters of the second predictive model based on the adjusted cost function.

5. The method of claim 1, wherein the first predictive model and the second predictive model are distinct models that operate at least in part differently from one another.

6. The method of claim 1, wherein updating the one or more parameters of the second predictive model comprises immediately adjusting the parameters responsive to the cost function for that provided image.

7. A computer-implemented method of inference by one or more predictive models each trained by a method of machine-learning for on-the-fly adaptation of a predictive model configured for image processing, the method of inference comprising:

providing one or more predictive models each trained by the method of machine-learning for on-the-fly adaptation of a predictive model configured for image processing, the method of machine learning comprising:

providing a first predictive model having been configured to provide at least one first prediction task;

providing a second predictive model having been configured to provide a second prediction task, the second predictive model comprising one or more parameters, the second prediction task being derivable from the first prediction task;

providing context-based images from a first stream of images obtained from an optical sensor to both the first and the second predictive models, each provided image being provided just once on-the-fly; and performing an on-the-fly adaptation for the second predictive model, the on-the-fly adaptation comprising, for each provided image:

performing a respective first prediction by the first predictive model and a respective second prediction by the second predictive model for the same provided image;

computing a cost function of the respective first prediction and the respective second prediction for the same provided image; and updating the one or more parameters of the second predictive model based on the computed cost function;

providing a context-based image from a second stream of images;

obtaining one or more predictions each obtained by applying one of the one or more predictive models to the provided image;

computing one or more weights, each weight being computed for one of the one or more predictions; and computing a prediction from a combination of the one or more predictions and their respective one or more weights.

8. The method of inference of claim 7, further comprising:

providing a baseline predictive model;

obtaining, for the context-based image provided from the second stream, a prediction by applying the baseline predictive model to the provided image; and computing a weight corresponding to the prediction obtained by the baseline predictive model, wherein the performing an inference is based on the prediction obtained by the baseline predictive model and the corresponding weight, and based on the one or more predictions and the corresponding one or more weights.

9. The method of inference of claim 8, wherein the computing one or more weights, each weight corresponding to one of the one or more predictions and the computing a weight corresponding to the prediction obtained by the baseline predictive model further comprise computing a prior condition from the prior information of the provided image.

10. The method of inference according to claim 8, further comprising:

providing a reference predictive model; and wherein the computing the one or more weights, each weight corresponding to one of the one or more predictions, and/or the computing the weight corresponding to the prediction obtained by the baseline predictive model comprise computing a posterior condition based on one or more of the following:

the prediction of the predictive model corresponding to the weight;

and/or a prediction obtained by the reference predictive model for the provided image.

11. The method of inference according to claim 8, wherein the provided baseline predictive model has been trained according to a method of machine-learning for on-the-fly adaptation of a predictive model configured for image processing, the method of machine-learning comprising:

providing a first predictive model having been configured to provide at least one first prediction task;

providing a second predictive model having been configured to provide a second prediction task, the second predictive model comprising one or more parameters, the second prediction task being derivable from the first prediction task;

providing context-based images from a first stream of images obtained from an optical sensor to both the first and the second predictive models, each provided image being provided just once on-the-fly; and performing an on-the-fly adaptation for the second predictive model, the on-the-fly adaptation comprising, for each provided image:

performing a respective first prediction by the first predictive model and a respective second prediction by the second predictive model;

computing a cost function of the respective first prediction and the respective second prediction; and updating the one or more parameters of the second predictive model based on the computed cost function.

12. The method of inference according to claim 11, wherein the method of machine learning used for training the provided baseline predictive model further comprises:

calibrating the second predictive model by performing the on-the-fly adaptation for the second predictive model using a few-shot learning method that is carried out with a limited number of the context-based images obtained, on-the-fly and just once, from the first stream of images.

13. The method of inference according to claim 11, wherein the method of machine learning used for training the provided baseline predictive model further comprises prior to, performing, for each provided image, the respective first prediction and the respective second prediction:

computing a prior condition from prior information of the provided image; and determining, based on the prior condition, whether the one or more images are to be provided to the first and the second model.

14. The method of inference according to claim 13, wherein the method of machine learning used for training the provided baseline predictive model further comprises:

adjusting the computed cost function based on the prior information and updating the one or more parameters of the second predictive model based on the adjusted cost function.

15. The method of inference according to claim 7, wherein the method of machine learning further comprises:

performing the on-the-fly adaptation for the second predictive model further comprises:

calibrating the second predictive model by performing the on-the-fly adaptation for the second predictive model using a few-shot learning method that is carried out with a limited number of the context-based images obtained, on-the-fly and just once, from the first stream of images.

16. The method of inference according to claim 7, wherein the method of machine learning further comprises prior to, performing, for each provided image, the respective first prediction and the respective second prediction:

computing a prior condition from prior information of the provided image; and determining, based on the prior condition, whether the one or more images are to be provided to the first and the second model.

17. The method of inference according to claim 16, wherein the method of machine-learning further comprises:

adjusting the computed cost function based on the prior information and updating the one or more parameters of the second predictive model based on the adjusted cost function.

18. A processing machine, the processing machine comprising:

a first interface device configured to:
receive a stream of images from an optical sensor;

a data storage unit device configured to:
store one or more predictive models each trained with a method of machine-learning for on-the-fly adaptation of a predictive model configured for image processing, the method of machine-learning comprising:
providing a first predictive model having been configured to provide at least one first prediction task;
providing a second predictive model having been configured to provide a second prediction task, the second predictive model comprising one or more parameters, the second prediction task being derivable from the first prediction task;
providing context-based images from a first stream of images obtained from an optical sensor to both the first and the second predictive models, each provided image being provided just once on-the-fly; and
performing an on-the-fly adaptation for the second predictive model, the on-the-fly adaptation comprising, for each provided image:
performing a respective first prediction by the first predictive model and a respective second prediction by the second predictive model for the same provided image;
computing a cost function of the respective first prediction and the respective second prediction for the same provided image; and
updating the one or more parameters of the second predictive model based on the computed cost function; and a processing unit device configured to:
perform the method of machine-learning for on-the-fly adaptation of a predictive model configured for image processing; and
perform a method of inference by providing the one or more predictive models stored on the data storage unit device, the method of inference comprising:
providing a context-based image from a second stream of images;
obtaining one or more predictions each obtained by applying one of the one or more predictive models to the provided image;
computing one or more weights, each weight being computed for one of the one or more predictions; and
computing a prediction from a combination of the one or more predictions and their respective one or more weights.

19. The processing machine of claim 18, wherein the processing unit device is further configured to:

re-train one or more of the one or more predictive models stored on the data storage unit device; and select one or more of the one or more predictive models stored on the data storage unit device and to perform the method of inference on the selected one or more predictive models.

20. The processing machine of claim 18, further comprising:

a second interface device configured to connect with a repository; and wherein the processing unit device is further configured to:

store on the repository the one or more predictive models if a condition is satisfied; and retrieve one or more predictive models stored on the repository.

21. The processing machine of claim 18, wherein the method of machine learning used for the training of each of one or more predictive models stored on the data storage unit device and the one or more methods of machine-learning performed further comprises:

performing the on-the-fly adaptation for the second predictive model further comprises calibrating the second predictive model by performing the on-the-fly adaptation for the second predictive model using a few-shot learning method that is carried out with a limited number of the context-based images obtained, on-the-fly and just once, from the first stream of images.

22. The processing machine of claim 18, wherein the method of inference further comprises:

providing a baseline predictive model;

obtaining, for the context-based image provided from the second stream, a prediction by applying the baseline predictive model to the provided image; and computing a weight corresponding to the prediction obtained by the baseline predictive model, wherein the performing an inference is based on the prediction obtained by the baseline predictive model and the corresponding weight, and based on the one or more predictions and the corresponding one or more weights.

* * * * *